United States Patent
Liu et al.

(10) Patent No.: US 11,284,446 B2
(45) Date of Patent: Mar. 22, 2022

(54) INFORMATION TRANSMISSION METHOD, AND BASE STATION, TERMINAL AND COMPUTER-READABLE STORAGE MEDIUM

(71) Applicant: ZTE CORPORATION, Guangdong (CN)

(72) Inventors: Kun Liu, Shenzhen (CN); Bo Dai, Shenzhen (CN); Huiying Fang, Shenzhen (CN); Xianming Chen, Shenzhen (CN); Weiwei Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 78 days.

(21) Appl. No.: 16/911,184

(22) Filed: Jun. 24, 2020

(65) Prior Publication Data

US 2020/0329506 A1 Oct. 15, 2020

Related U.S. Application Data

(63) Continuation of application No. PCT/CN2018/124257, filed on Dec. 27, 2018.

(30) Foreign Application Priority Data

Jan. 31, 2018 (CN) .......................... 201810098615.0

(51) Int. Cl.
*H04W 74/08* (2009.01)
*H04W 72/04* (2009.01)

(52) U.S. Cl.
CPC ... *H04W 74/0833* (2013.01); *H04W 72/0453* (2013.01)

(58) Field of Classification Search
CPC ............. H04W 74/0833; H04W 4/70; H04W 72/0453; H04W 24/08; H04W 24/02; H04W 48/12; H04L 5/0053
See application file for complete search history.

(56) References Cited

U.S. PATENT DOCUMENTS

2018/0254937 A1* 9/2018 Dore ................... H04L 27/2698
2018/0359067 A1* 12/2018 Kim .................. H04W 72/0446
(Continued)

FOREIGN PATENT DOCUMENTS

| CN | 101521902 A | 9/2009 |
| CN | 102056322 A | 5/2011 |
| WO | WO-2017/061939 A1 | 4/2017 |

OTHER PUBLICATIONS

International Search Report for PCT Appl. No. PCT/CN2018/124257 dated Mar. 28, 2019, (7 Pages with translation).
(Continued)

*Primary Examiner* — Brian D Nguyen
(74) *Attorney, Agent, or Firm* — Foley & Lardner LLP

(57) ABSTRACT

Provided are an information transmission method, a base station, a terminal and a computer-readable storage medium. The information transmission method includes: a base station sending a first message. The first message includes at least one of: at least one set of channel quality threshold values, where each of the at least one set of channel quality threshold values includes at least one channel quality threshold value; or a deviation value relative to the at least one channel quality threshold value. The at least one channel quality threshold value is set according to at least one following type of channel quality: reference signal receiving power, a reference signal receiving quality, a downlink signal to interference plus noise ratio, a downlink signal to noise ratio, an uplink signal to interference plus noise ratio,
(Continued)

A base station sends a first message, where the first message includes at least one of: at least one set of channel quality threshold values, where each set of channel quality threshold values includes at least one channel quality threshold value; or a deviation value relative to the channel quality threshold value; where the channel quality threshold value is set according to at least one following type of channel quality: reference signal receiving power; a reference signal receiving quality; a downlink signal to interference plus noise ratio; a downlink signal to noise ratio; an uplink signal to interference plus noise ratio; an uplink signal to noise ratio; a downlink path loss, or an uplink path loss

— 101 an uplink signal to noise ratio, a downlink path loss, or an uplink path loss.

20 Claims, 5 Drawing Sheets

(56) References Cited

U.S. PATENT DOCUMENTS

| | | | |
|---|---|---|---|
| 2019/0036746 A1* | 1/2019 | Hwang | H04L 27/3444 |
| 2019/0052500 A1* | 2/2019 | Choi | H04L 27/26416 |
| 2019/0132843 A1* | 5/2019 | Byun | H04W 72/0453 |
| 2020/0228273 A1* | 7/2020 | Yoon | H04L 27/2613 |
| 2020/0367216 A1* | 11/2020 | Yl | H04L 5/0037 |
| 2021/0044463 A1* | 2/2021 | Hwang | H04L 5/0083 |

OTHER PUBLICATIONS

Ericsson, "Improved FH randomization for NB-IoT Rel-14", 3GPP TSG RAN WG1 #90 R1-1712636, Prague, Czech Republic, Aug. 11, 2017 (5 pages).
First Office Action JP 2020-541895 dated Oct. 1, 2021 (6 pages, including English translation).
ZTE, "NPRACH range enhancement for NB-IoT", 3GPP TSG RAN WG1 #89 R1-1707104, Hangzhou, China, May 6, 2017 (7 pages).

* cited by examiner

A base station sends a first message, where the first message includes at least one of: at least one set of channel quality threshold values, where each set of channel quality threshold values includes at least one channel quality threshold value; or a deviation value relative to the channel quality threshold value; where the channel quality threshold value is set according to at least one following type of channel quality: reference signal receiving power; a reference signal receiving quality; a downlink signal to interference plus noise ratio; a downlink signal to noise ratio; an uplink signal to interference plus noise ratio; an uplink signal to noise ratio; a downlink path loss, or an uplink path loss — 101

FIG. 1

A terminal receives a first message sent by a base station, where the first message includes at least one of: at least one set of channel quality threshold values, where each set of channel quality threshold values includes at least one channel quality threshold value; or a deviation value relative to the channel quality threshold value; where the channel quality threshold value is set according to at least one following type of channel quality: reference signal receiving power, a reference signal receiving quality, a downlink signal to interference plus noise ratio, a downlink signal to noise ratio, an uplink signal to interference plus noise ratio, an uplink signal to noise ratio, a downlink path loss, or an uplink path loss — 201

FIG. 2

A terminal receives a first message sent by a base station, where the first message includes at least one of: at least one set of channel quality threshold values, where each set of channel quality threshold values includes at least one channel quality threshold value; or a deviation value relative to the channel quality threshold value; where the channel quality threshold value is set according to at least one following type of channel quality: reference signal receiving power, a reference signal receiving quality, a downlink signal to interference plus noise ratio, a downlink signal to noise ratio, an uplink signal to interference plus noise ratio, an uplink signal to noise ratio, a downlink path loss, or an uplink path loss — 301

The terminal sends an Msg1 message, where the Msg1 message includes at least one first structure, the first structure includes at least one symbol group, a symbol group of the first structure includes a cyclic prefix and at least one symbol, or includes a cyclic prefix, at least one symbol, and guard time, and each symbol in the same symbol group of the first structure occupies the same subcarrier in the frequency domain — 302

FIG. 3

A base station sends a Random Access Response, Msg2 message, through a downlink channel, where the Msg2 message at least includes a MAC header and MAC payload, and adjustment information of Msg1 is sent in the Msg2 message ⎯ 401
FIG. 4
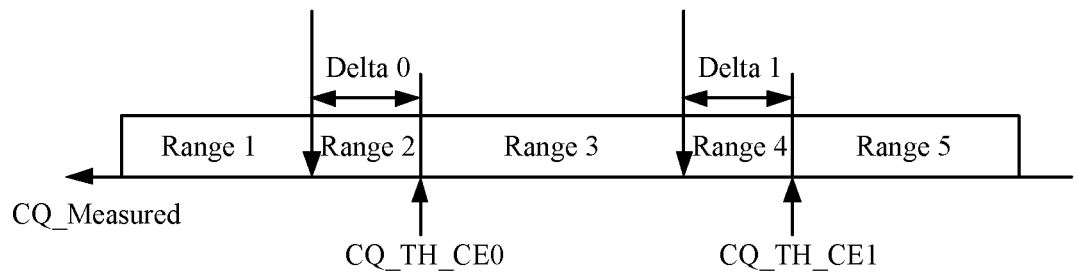
FIG. 5
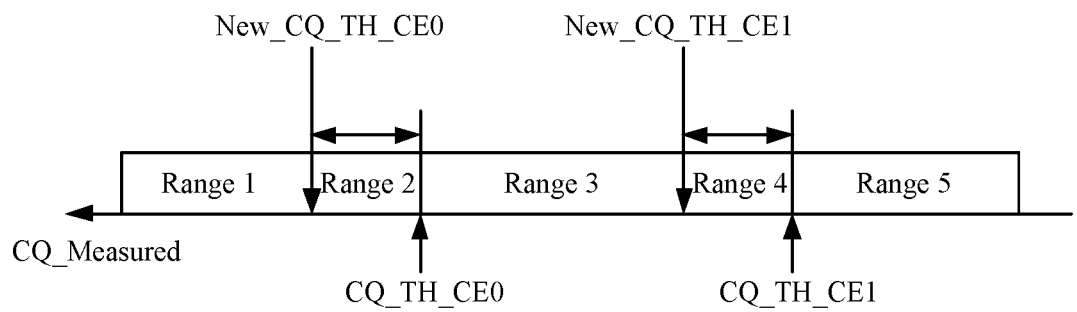
FIG. 6

INFORMATION TRANSMISSION METHOD, AND BASE STATION, TERMINAL AND COMPUTER-READABLE STORAGE MEDIUM

This application claims the benefit of priority under 35 U.S.C. § 120 as a continuation of PCT Patent Application No. PCT/CN2018/124257, filed on Dec. 27, 2018, which claims priority to Chinese patent application no. 201810098615.0, filed on Jan. 31, 2018, the disclosure of each of which is incorporated herein by reference in its entirety.

TECHNICAL FIELD

The present application relates to the technical field of wireless communications, for example, relates to an information transmission method, a base station, a terminal, and a computer-readable storage medium.

BACKGROUND

Machine Type Communication (MTC) user equipment (UE) (MTC UE for short), also referred to as Machine to Machine (M2M) UE, is currently the primary application form of the Internet of Things. The Narrow Band Internet of Things (NB-IoT) technology based on a cellular technology is an important issue in 3rd Generation Partnership Project (3GPP) Release 13, and 3GPP protocol related content corresponding to the NB-IoT technology is approved by a radio access network (RAN) plenary.

Since various coverage enhancement levels (CE levels) are supported in an NB-IoT system, uplink channels or downlink channels of different coverage enhancement levels adopt different numbers of repeated times. The UE in the NB-IoT determines a coverage enhancement level and selects, according to the determined coverage enhancement level, a corresponding random access channel for sending message 1 (Msg1). The numbers of repeated sending times of messages (e.g., Msg2, Msg3 and Msg4 and scheduling information of the above messages) involved in the subsequent random access process are determined by the coverage enhancement level selected by the UE. The UE can only measure downlink channel quality information, so when a matching degree between an uplink channel quality and a downlink channel quality is poor, there are deviations in the selection of the numbers of repeated sending times of Msg1 and Msg3 through the uplink channel, Thus, Msg1 and Msg3 cannot be successfully transmitted, or Msg1 and Msg3 occupy excessive resources for transmission, resulting in certain waste of resources. Meanwhile, since the NB-IoT UE does not feed back downlink channel quality information to the base station, the number of repeated sending times of the downlink channel (such as Msg2, Msg4 and scheduling information of the above messages) cannot be flexibly adjusted by the base station, and if the number of repeated sending times of the downlink channel selected by the base station is too large, certain waste of resources will also be caused.

SUMMARY

The present application provides an information transmission method, a base station, a terminal and a computer-readable storage medium, which can improve the success rate of uplink channel transmission.

Technical schemes of the embodiments of the present application are implemented as follows.

An embodiment of the present application provides an information transmission method. The information transmission method includes following steps: a base station sends a first message, where the first message includes at least one of: at least one set of channel quality threshold values, where each of the at least one set of channel quality threshold values includes at least one channel quality threshold value; or a deviation value relative to the at least one channel quality threshold value; where the at least one channel quality threshold value is set according to at least one following type of channel quality: reference signal receiving power, a reference signal receiving quality, a downlink signal to interference plus noise ratio, a downlink signal to noise ratio, an uplink signal to interference plus noise ratio, an uplink signal to noise ratio, a downlink path loss, or an uplink path loss.

An embodiment of the present application further provides a base station. The base station includes a processor, a memory and a communication bus. The communication bus is configured to implement connection communication between the processor and the memory. The processor is configured to execute information transmission programs stored in the memory to implement the information transmission method described above.

An embodiment of the present application further provides an information transmission method. The information transmission method includes following steps: a terminal receives a first message sent by a base station, where the first message includes at least one of: at least one set of channel quality threshold values, where each of the at least one set of channel quality threshold values includes at least one channel quality threshold value; or a deviation value relative to the at least one channel quality threshold value; where the at least one channel quality threshold value is set according to at least one following type of channel quality: reference signal receiving power, a reference signal receiving quality, a downlink signal to interference plus noise ratio, a downlink signal to noise ratio, an uplink signal to interference plus noise ratio, an uplink signal to noise ratio, a downlink path loss, or an uplink path loss.

An embodiment of the present application further provides a terminal. The terminal includes a processor, a memory and a communication bus. The communication bus is configured to implement connection communication between the processor and the memory. The processor is configured to execute information transmission programs stored in the memory to implement the information transmission method described above.

An embodiment of the present application further provides an information transmission method. The information transmission method includes following steps: a terminal receives a first message sent by a base station, where the first message includes at least one of: at least one set of channel quality threshold values, where each of the at least one set of channel quality threshold values includes at least one channel quality threshold value; or a deviation value relative to the at least one channel quality threshold value; and the terminal sends a random access preamble, Msg1 message, where the Msg1 message includes at least one first structure; where each of the at least one first structure includes at least one symbol group, and each of the at least one symbol group of the first structure includes a cyclic prefix and at least one symbol, or includes a cyclic prefix, at least one symbol, and guard time.

An embodiment of the present application further provides a terminal. The terminal includes a processor, a memory and a communication bus. The communication bus is configured to implement connection communication between the processor and the memory. The processor is configured to execute information transmission programs stored in the memory to implement the information transmission method described above.

An embodiment of the present application further provides an information transmission method. The information transmission method includes following steps: a base station sends a Random Access Response, Msg2 message, through a downlink channel, where the Msg2 message includes at least a medium access control (MAC) header and MAC payload; where the Msg2 message further includes adjustment information of the random access preamble, Msg1 message.

An embodiment of the present application further provides a base station. The base station includes a processor, a memory and a communication bus. The communication bus is configured to implement connection communication between the processor and the memory. The processor is configured to execute information transmission programs stored in the memory to implement the information transmission method described above.

An embodiment of the present application further provides a computer-readable storage medium. The computer-readable storage medium is configured to store one or more programs, where one or more processors are capable of executing the one or more programs to implement any information transmission method described above.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings:

FIG. 1 is a flowchart of a first information transmission method according to an embodiment of the present application;

FIG. 2 is a flowchart of a second information transmission method according to an embodiment of the present application;

FIG. 3 is a flowchart of a third information transmission method according to an embodiment of the present application;

FIG. 4 is a flowchart of a fourth information transmission method according to an embodiment of the present application;

FIG. 5 is a schematic diagram illustrating a first configuration structure of channel quality threshold values according to an embodiment of the present application;

FIG. 6 is a schematic diagram illustrating a second configuration structure of channel quality threshold values according to an embodiment of the present application;

DETAILED DESCRIPTION

Figure 7:
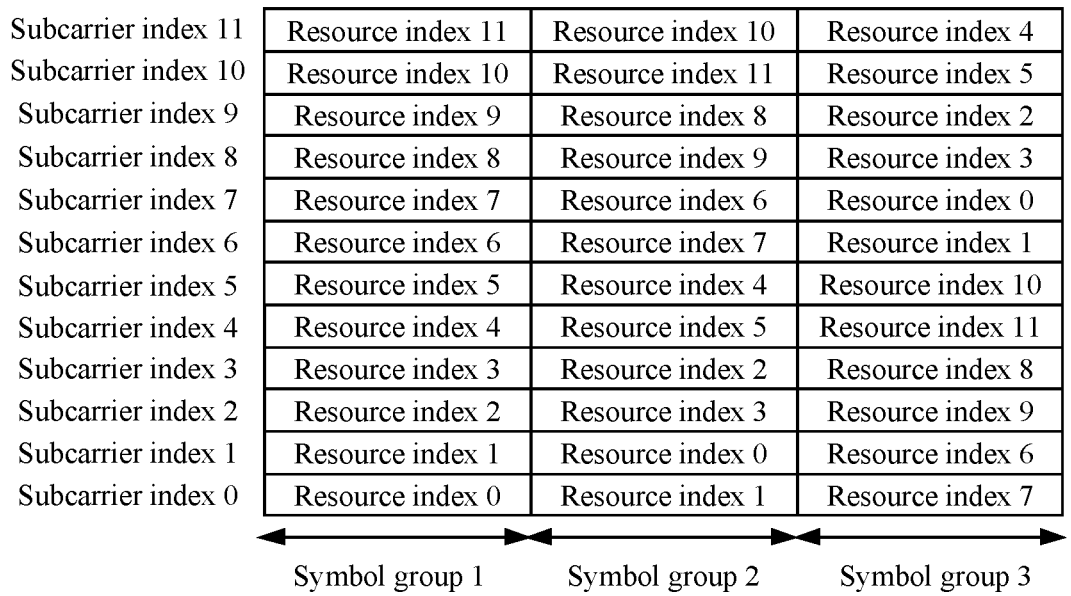
FIG. 7 is a schematic diagram illustrating twelve constituent patterns of a first type of a first structure according to an embodiment of the present application.

Embodiments of the present application will be described hereinafter in detail with reference to the drawings. It should be noted that if not in collision, the embodiments and features therein in the present application may be combined with each other.

After a UE in the NB-IoT sends a random access signal (also referred to as Msg1) through a narrow band physical random access channel (NPRACH) of the NB-IoT system, the UE receives a Random Access Response (RAR) message (also referred to as Msg2) sent by a base station. Scheduling information of the RAR is included in downlink control information (DCI) and sent through a narrow band physical downlink control channel (NPDCCH).

The UE in the NB-IoT receives the RAR message to obtain uplink time synchronization and uplink resources. However, it cannot be determined at this time that the RAR message is sent to the UE itself rather than to other UEs because there is a possibility that different UEs send the same random access sequence on the same time-frequency resource so that the different UEs receive the same RAR through the same random access radio network temporary identity (RA-RNTI). Furthermore, the UE does not know whether other UEs are using the same resources for random access. Thus, the UE needs to resolve such a random access collision by subsequent message 3 (Msg3) and message 4 (Msg4), where Msg3 is also referred to as a collision detection message, and Msg4 is also referred to as a collision detection response message.

Msg3 is a message transmitted through a narrow band physical uplink shared channel (NPUSCH) based on uplink scheduling and using a Hybrid Automatic Repeat reQuest (HARM) mechanism. A Radio Resource Control (RRC) Connection Request (RRC Connection Request) message or an RRC Connection Resume Request message is transmitted in Msg3. If different UEs receive the same RAR message, the different UEs obtain the same uplink resources, and simultaneously send the Msg3 message. In order to distinguish between different UEs, a UE-specific Identity (ID) is carried in Msg3 to distinguish between different UEs. In the case of initial access, such ID may be a Serving-Temporary Mobile Subscriber Identity (S-TMSI) (if it exists) of the UE or a randomly generated 40-bit value.

The UE starts a contention resolution timer immediately after sending the Msg3 message (and then restarts the timer every time Msg3 is retransmitted), and the UE needs to listen for the collision detection response message (Msg4 message) returned to the UE itself by the base station within this time. After successfully receiving the Msg4 message sent by the base station, the UE sends an RRC Connection Setup Complete message or an RRC Connection Resume Complete message to the base station to notify the base station, where both the RRC Connection Setup Complete message and the RRC Connection Resume Complete message are referred to as Msg5.

Referring to FIG. 1, the present application provides an information transmission method. The method includes step 101 described below.

In step 101, a base station sends a first message, where the first message includes at least one of: at least one set of channel quality threshold values, where each set of channel quality threshold values includes at least one channel quality threshold value; or a deviation value relative to the channel quality threshold value.

The channel quality threshold value is set according to at least one following type of channel quality: reference signal received power (RSRP); a reference signal receiving quality (RSRQ); a downlink signal to interference plus noise ratio (SINR); a downlink signal to noise ratio (SINR); an uplink signal to interference plus noise ratio; an uplink signal to noise ratio; a downlink path loss, or an uplink path loss.

It should be noted that the channel quality threshold value is used for the following: the terminal acquires a channel quality measurement value, compares the channel quality measurement value with a corresponding channel quality threshold value, and determines a coverage enhancement level or a coverage enhancement level of a downlink channel or a repeated sending level of a downlink channel or the number of repeated sending times of a downlink channel. The deviation value relative to the channel quality threshold value may be for one or more channel quality threshold values in one set of threshold values.

In an embodiment, the first message is sent through a system message or a broadcast message or a downlink channel.

In an embodiment, the first message includes one of: one set of channel quality threshold values and a deviation value relative to channel quality threshold values in the one set of channel quality threshold values; two sets of channel quality threshold values; or one set of channel quality threshold values.

It should be noted that deviation values for the set of channel quality threshold values may be configured for respective threshold values in the set of threshold values, or that all threshold values in the set of threshold values share the same deviation value. The channel qualities selected for the two sets of channel quality threshold values may be the same type of channel quality, such as the RSRP. Alternatively, the channel qualities selected for two sets of channel quality threshold values may be different types of channel qualities, for example, a channel quality selected for the first set of channel quality threshold values is the RSRP, and a channel quality selected for the second set of channel quality threshold values is the RSRQ; or the channel quality selected for the first set of channel quality threshold values is the RSRP, and the channel quality selected for the second set of channel quality threshold values is the downlink SINR.

In an embodiment, the first set of channel quality threshold values is used for selecting a coverage enhancement level of an uplink channel; and the second set of channel quality threshold value is used for selecting a coverage enhancement level of a downlink channel.

In an embodiment, when the first message includes the deviation value relative to the channel quality threshold value, the first message further includes an Enable identity of the channel quality deviation value; or the base station sends the Enable identity of the channel quality deviation value through a message (a system message or a broadcast message or a downlink channel) other than the first message.

It should be noted that the Enable identity described herein includes both enablement and disablement. For example, when the first message specifies that the channel quality deviation value is enabled, the terminal may use the enabled channel quality deviation value; when the first message specifies that the channel quality deviation value is disabled, the terminal may not use the disabled channel quality deviation value.

In an embodiment, when the number of sets of channel quality threshold values included in the first message is greater than 1, the first message further includes Enable identities of other sets of channel quality threshold values in addition to a predetermined set of channel quality threshold values; or Enable identities of other sets of channel quality threshold values in addition to a predetermined set of channel quality threshold values are sent through a message (such as a system message or a broadcast message or a downlink channel) other than the first message.

It should be noted that the meaning of the predetermined set of channel quality threshold values includes at least one of the following: a set of channel quality threshold values pre-stored in the base station and the terminal; or a set of channel quality threshold values that the base station notifies the terminal through signaling.

In an embodiment, the base station divides channel qualities into multiple channel quality value ranges according to the first message.

It should be noted that one channel quality value range corresponds to one coverage enhancement level; or one or more channel quality value ranges correspond to one coverage enhancement level.

In an embodiment, the channel quality value range includes at least one of:

the channel quality measurement value being greater than or equal to the sum of CQ_TH_CE0 and Delta0;

the channel quality measurement value being between CQ_TH_CE0 and the sum of CQ_TH_CE0 and Delta0;

the channel quality measurement value being between the sum of CQ_TH_CE1 and Delta1 and CQ_TH_CE0;

the channel quality measurement value being between CQ_TH_CE1 and the sum of CQ_TH_CE1 and Delta1; or the channel quality measurement value being less than or equal to CQ_TH_CE1.

CQ_TH_CE0 is a channel quality threshold value corresponding to a coverage enhancement level 0, CQ_TH_CE1 is a channel quality threshold value corresponding to a coverage enhancement level 1, Delta0 is a deviation value corresponding to a channel quality threshold value of the coverage enhancement level 0, and Delta1 is a deviation value corresponding to a channel quality threshold value of the coverage enhancement level 1.

It should be noted that a value directly measured by the terminal may be referred to as the channel quality measurement value; the channel quality measurement value measured by the terminal, and other channel quality information calculated or estimated by the terminal are also referred to as the channel quality measurement value.

In an embodiment, the repeated sending levels or numbers of repeated sending times of the uplink channel corresponding to the following channel quality value ranges are the same:

the channel quality measurement value being greater than or equal to the sum of CQ_TH_CE0 and Delta0; and the channel quality measurement value being between CQ_TH_CE0 and the sum of CQ_TH_CE0 and Delta0.

In an embodiment, the repeated sending levels or numbers of repeated sending times of the uplink channel corresponding to the following channel quality value ranges are the same:

the channel quality measurement value being between the sum of CQ_TH_CE1 and Delta1 and CQ_TH_CE0; and the channel quality measurement value being between CQ_TH_CE1 and the sum of CQ_TH_CE1 and Delta1.

In an embodiment, the channel quality value range includes at least one of:

the channel quality measurement value being greater than or equal to New_CQ_TH_CE0;

the channel quality measurement value being between CQ_TH_CE0 and New_CQ_TH_CE0;

the channel quality measurement value being between New_CQ_TH_CE1 and CQ_TH_CE0;

the channel quality measurement value being between CQ_TH_CE1 and New_CQ_TH_CE1; or the channel quality measurement value being less than or equal to CQ_TH_CE1.

CQ_TH_CE0 and CQ_TH_CE1 are a set of channel quality threshold values, where CQ_TH_CE0 is the channel quality threshold value corresponding to the coverage enhancement level 0 and CQ_TH_CE1 is the channel quality threshold value corresponding to the coverage enhancement level 1. New_CQ_TH_CE0 and New_CQ_TH_CE1 are another set of channel quality threshold values, where New_CQ_TH_CE0 is the channel quality threshold value corresponding to the coverage enhancement level 0 and New_CQ_TH_CE1 is the channel quality threshold value corresponding to the coverage enhancement level 1.

In an embodiment, the repeated sending levels or numbers of repeated sending times of the uplink channel corresponding to the following channel quality value ranges are the same:

the channel quality measurement value being greater than or equal to New_CQ_TH_CE0; and the channel quality measurement value being between CQ_TH_CE0 and New_CQ_TH_CE0.

In an embodiment, the repeated sending levels or numbers of repeated sending times of the uplink channel corresponding to the following channel quality value ranges are the same: the channel quality measurement value being between New_CQ_TH_CE1 and CQ_TH_CE0; and the channel quality measurement value being between CQ_TH_CE1 and New_CQ_TH_CE1.

In an embodiment, the uplink channel includes at least one of:

an uplink channel used when Msg1 is sent;
an uplink channel used when Msg3 is sent;
an uplink channel used when Msg5 is sent;
an uplink channel used when an uplink (UL) Information Transfer message is sent;
an uplink channel used when a UE Capability Information message is sent; or
an uplink channel used when a UE Information Response message is sent.

In an embodiment, the random access channel resource corresponding to each channel quality value range is configured independently (i.e., the random access channel resource corresponding to each channel quality value range is configured through an independent parameter).

The random access channel resource includes at least one of:

a time domain-frequency domain resource occupied by a random access channel;
a sequence for sending a random access signal;
a beam direction or beam index selected for sending a random access signal; or
index information of a synchronization signal (SS)/physical broadcast channel (PBCH) block including configuration information of a random access channel resource.

It should be noted that the SS/PBCH block is a time domain-frequency domain resource block that includes at least an SS and a system information block (SIB). The SIB is sent in a PBCH. The system may be configured with one or more SS/PBCH blocks.

In an embodiment, Msg1 resource configuration information exists in each SS/PBCH block among the configured one or more SS/PBCH blocks.

In an embodiment, Msg1 resource configuration information exists in part of the SS/PBCH blocks among the configured one or more SS/PBCH blocks.

In an embodiment, the number of repeated sending times or repeated sending level of the downlink channel corresponding to each channel quality value range is independently configured.

It should be noted that the base station receives a random access signal sent by the terminal, determines a corresponding value range according to a resource where the random access signal is located, and configures the corresponding number of repeated sending times or repeated sending level of the downlink channel for the terminal according to the value range.

In an embodiment, the downlink channel includes at least one of:

a downlink channel used when a random access response message is sent;
a downlink channel used when scheduling information of a random access response message is sent;
a downlink channel used when Msg4 is sent; or
a downlink channel used when scheduling information of Msg4 is sent.

An embodiment of the present application further provides a base station. The base station includes a processor, a memory and a communication bus. The communication bus is configured to implement connection communication between the processor and the memory. The processor is configured to execute information transmission programs stored in the memory to implement any information transmission method described above.

An embodiment of the present application further provides a computer-readable storage medium. The computer-readable storage medium is configured to store one or more programs, where one or more processors are capable of executing the one or more programs to implement any information transmission method described above.

Referring to FIG. 2, an embodiment of the present application further provides an information transmission method. The method includes step 201 described below.

In step 201, a terminal receives a first message sent by a base station, where the first message includes at least one of: at least one set of channel quality threshold values, where each set of channel quality threshold values includes at least one channel quality threshold value; or a deviation value relative to the channel quality threshold value.

The channel quality threshold value is set according to at least one following type of channel quality: reference signal receiving power, a reference signal receiving quality, a downlink signal to interference plus noise ratio, a downlink signal to noise ratio, an uplink signal to interference plus noise ratio, an uplink signal to noise ratio, a downlink path loss, or an uplink path loss.

In an embodiment, the terminal divides channel qualities into multiple channel quality value ranges according to the first message.

In an embodiment, the channel quality value range includes at least one of:
 the channel quality measurement value being greater than or equal to the sum of CQ_TH_CE0 and Delta0;
 the channel quality measurement value being between CQ_TH_CE0 and the sum of CQ_TH_CE0 and Delta0;
 the channel quality measurement value being between the sum of CQ_TH_CE1 and Delta1 and CQ_TH_CE0;
 the channel quality measurement value being between CQ_TH_CE1 and the sum of CQ_TH_CE1 and Delta1; or
 the channel quality measurement value being less than or equal to CQ_TH_CE1.

CQ_TH_CE0 is a channel quality threshold value corresponding to a coverage enhancement level 0, CQ_TH_CE1 is a channel quality threshold value corresponding to a coverage enhancement level 1, Delta0 is a deviation value corresponding to a channel quality threshold value of the coverage enhancement level 0, and Delta1 is a deviation value corresponding to a channel quality threshold value of the coverage enhancement level 1.

In an embodiment, the repeated sending levels or numbers of repeated sending times of the uplink channel corresponding to the following channel quality value ranges are the same:
 the channel quality measurement value being greater than or equal to the sum of CQ_TH_CE0 and Delta0; and
 the channel quality measurement value being between CQ_TH_CE0 and the sum of CQ_TH_CE0 and Delta0.

In an embodiment, the repeated sending levels or numbers of repeated sending times of the uplink channel corresponding to the following channel quality value ranges are the same:
 the channel quality measurement value being between the sum of CQ_TH_CE1 and Delta1 and CQ_TH_CE0; and
 the channel quality measurement value being between CQ_TH_CE1 and the sum of CQ_TH_CE1 and Delta1.

In an embodiment, the channel quality value range includes at least one of:
 the channel quality measurement value being greater than or equal to New_CQ_TH_CE0;
 the channel quality measurement value being between CQ_TH_CE0 and New_CQ_TH_CE0;
 the channel quality measurement value being between New_CQ_TH_CE1 and CQ_TH_CE0;
 the channel quality measurement value being between CQ_TH_CE1 and New_CQ_TH_CE1; or
 the channel quality measurement value being less than or equal to CQ_TH_CE1.

CQ_TH_CE0 and CQ_TH_CE1 are a set of channel quality threshold values, where CQ_TH_CE0 is the channel quality threshold value corresponding to the coverage enhancement level 0 and CQ_TH_CE1 is the channel quality threshold value corresponding to the coverage enhancement level 1. New_CQ_TH_CE0 and New_CQ_TH_CE1 are another set of channel quality threshold values, where New_CQ_TH_CE0 is the channel quality threshold value corresponding to the coverage enhancement level 0 and New_CQ_TH_CE1 is the channel quality threshold value corresponding to the coverage enhancement level 1.

In an embodiment, the repeated sending levels or numbers of repeated sending times of the uplink channel corresponding to the following channel quality value ranges are the same:
 the channel quality measurement value being greater than or equal to New_CQ_TH_CE0; and
 the channel quality measurement value being between CQ_TH_CE0 and New_CQ_TH_CE0.

In an embodiment, the repeated sending levels or numbers of repeated sending times of the uplink channel corresponding to the following channel quality value ranges are the same:
 the channel quality measurement value being between New_CQ_TH_CE1 and CQ_TH_CE0; and
 the channel quality measurement value being between CQ_TH_CE1 and New_CQ_TH_CE1.

In an embodiment, the uplink channel includes at least one of:
 an uplink channel used when Msg1 is sent;
 an uplink channel used when Msg3 is sent;
 an uplink channel used when Msg5 is sent;
 an uplink channel used when an uplink Information Transfer message is sent;
 an uplink channel used when a UE Capability Information message is sent; or
 an uplink channel used when a UE Information Response message is sent.

In an embodiment, the method further includes a following step: the terminal transmits a second message through an uplink channel, where the second message includes at least one of:
 a coverage enhancement level;
 repeated sending information of a downlink channel, where the repeated sending information includes a repeated sending level or the number of repeated sending times;
 modulation coding information of a downlink channel, where the modulation coding information includes at least one of a modulation order or coding efficiency; or
 channel quality measurement information, where the channel quality measurement information includes a channel quality measurement value or a channel quality value range where a channel quality measurement value is located.

It should be noted that the several variables in the second message may be actual values or adjustment amounts relative to actual values. For example, the coverage enhancement level may be an actually selected coverage enhancement level, or a deviation value from the last coverage enhancement level, where the deviation value may be positive, negative, or zero.

The repeated sending information of the downlink channel may be an actually selected value, or a deviation value from the last selected value, where the deviation value may be positive, negative, or zero.

The modulation coding information of the downlink channel may be an actually selected value, or a deviation value from the last selected value, where the deviation value may be positive, negative, or zero.

The channel quality measurement information may be configured in a plurality, respectively for different types of channel qualities. The downlink channel at least includes a downlink control channel and a downlink shared channel, for example, a downlink control channel carrying scheduling information of Msg2 or scheduling information of Msg4, and a downlink shared channel carrying Msg2 or Msg4.

The meaning of the adjustment amount in the present application is as follows: the adjustment amount of a certain parameter is a deviation value between a value of the parameter in the last time and a value of the parameter after adjustment, where the adjustment amount may be positive, negative, or zero.

In an embodiment, the terminal satisfying a first condition transmits the second message through an uplink channel.

The first condition includes at least one of the conditions described below.

(1) A message (a system message or a broadcast message or a message through a downlink channel) sent by the base station to the terminal includes an identity for enabling sending of the sending message.
(2) The coverage enhancement level of the terminal is B, where B is a predetermined one or more coverage enhancement levels (it should be noted that the meaning of the predetermined one or more coverage enhancement levels includes at least one of: one or more coverage enhancement levels pre-stored in the base station and the terminal, or one or more coverage enhancement levels that the base station notifies the terminal through signaling).
(3) The coverage enhancement level of the terminal is greater than a preset coverage enhancement level threshold.
(4) The channel quality measurement value of the terminal is in a determined channel quality range.
(5) The first message includes the deviation value relative to the channel quality threshold value, and the deviation value relative to the channel quality threshold value is enabled (i.e., the enable identity is Enable).
(6) The first message includes the deviation value relative to the channel quality threshold value, and a value of the deviation value relative to the channel quality threshold value is not equal to a preset value.
(7) The number of sets of channel quality threshold values included in the first message is greater than 1, and other sets of channel quality threshold values in addition to a predetermined set of channel quality threshold values are enabled (it should be noted that the meaning of the predetermined set of channel quality threshold values includes: a set of channel quality threshold values pre-stored in the base station and the terminal, or a set of channel quality threshold values that the base station notifies the terminal through signaling).
(8) The number of sets of channel quality threshold values included in the first message is greater than 1.
(9) The first message includes the deviation value relative to the channel quality threshold value.

It should be noted that in an embodiment, the preset coverage enhancement level threshold is level 0.

When three coverage enhancement levels are configured and the level numbers of them are 0, 1 and 2, and when the preset coverage enhancement level threshold is 0, the first condition refers to the terminal with coverage enhancement levels 1 and 2.

In an embodiment, the first condition includes one of several following condition combinations:
a first condition combination: (1) (2), (1) (3) or (1) (4);
a second condition combination: (2) (4);
a third combination of conditions: (3) (4);
a fourth condition combination: (1) (2) (4) or (1) (3) (4);
a fifth condition combination: (8) (2), (8) (3) or (8) (4);
a sixth condition combination: (9) (2), (9) (3) or (9) (4);
a seventh condition combination: (8) (2) (4) or (8) (3) (4); or
an eighth condition combination: (9) (2) (4) or (9) (3) (4).

(i) is the i-th piece of content included in the first condition, and i is a natural number from 1 to 9.

In an embodiment, the terminal determines a corresponding channel quality value range according to the selected coverage enhancement level, and then transmits the second message through an uplink channel.

It should be noted that the one coverage enhancement level corresponds to a predetermined channel quality value range, i.e., one coverage enhancement level may correspond to one or more channel quality value ranges.

In an embodiment, when the second message includes a downlink channel quality measurement value or a channel quality value range in which the downlink channel quality measurement value is located, the downlink channel quality measurement value or the channel quality value range in which the downlink channel quality measurement value is located is indicated by using N bits, where N is an integer greater than or equal to 1, and the channel quality value range quantized by the N bits is at least one of the following:
  a channel quality value range corresponding to the coverage enhancement level selected by the terminal;
  a channel quality value range corresponding to a random access channel resource where a random access signal sent by the terminal is located;
  a channel quality value range whose channel quality values are greater than or equal to a channel quality value A, where A is a minimum value in a channel quality value range corresponding to a random access channel resource where a random access signal sent by the terminal is located or a boundary value in a channel quality value range or a predetermined value in a channel quality value range; or
  multiple channel quality value ranges (which may include a channel quality value range corresponding to the coverage enhancement level selected by the terminal or a channel quality value range corresponding to a random access channel resource where a random access signal sent by the terminal is located).

In an embodiment, when the channel quality value range quantized by N bits is the multiple channel quality value ranges, the multiple channel quality value ranges includes the following:
  the channel quality value range corresponding to the coverage enhancement level selected by the terminal, where the number of quantized segments in the channel quality value range corresponding to the coverage enhancement level selected by the terminal is not less than the number of quantized segments in each of other channel quality value ranges; or
  the channel quality value range corresponding to the random access channel resource where the random access signal sent by the terminal is located, where the number of quantized segments in the channel quality value range corresponding to the random access channel resource where the random access signal sent by the terminal is located is not less than the number of quantized segments in each of other channel quality value ranges.

For example, 114 reported values of the RSRP are shown in Table 1, the index values are from 0 to 113, and a RSRP value range corresponding to each index value is shown in Table 1.

TABLE 1

| Reported value | Measured quantity value | Unit |
| --- | --- | --- |
| RSRP_00 | RSRP < −156 | dBm |
| RSRP_01 | −156 ≤ RSRP < −155 | dBm |
| RSRP_02 | −155 ≤ RSRP < −154 | dBm |
| ... | ... | ... |
| RSRP_111 | −46 ≤ RSRP < −45 | dBm |
| RSRP_112 | −45 ≤ RSRP < −44 | dBm |
| RSRP_113 | −44 ≤ RSRP | dBm |

When three coverage enhancement levels are configured in the system, the respective RSRP value ranges are as described below.

RSRP corresponding to CE level 0 is −110 dBm≤RSRP, i.e., values of the RSRP corresponding to indexes 47 to 113.

RSRP corresponding to CE level 1 is −120 dBm<RSRP≤−110 dBm, i.e., values of the RSRP corresponding to indexes 37 to 46.

RSRP corresponding to CE level 2 is RSRP≤−120 dBm, i.e., values of the RSRP corresponding to indexes 0 to 36.

When the CE level selected by the terminal is CE level 1, the channel quality value range which may be quantized by N (for example, N=3) bits by the UE is the quality value range corresponding to CE level 1 and CE level 0. The number of quantized segments in the quality value range corresponding to CE level 1 is 5, and the number of quantized segments in the quality value range corresponding to the CE level 0 is 3. For example, for five quantized segments corresponding to CE level 1, each segment corresponds to two RSRP value indexes, with (index 37, index 38) corresponding to the first quantized segment, (index 39, index 40) corresponding to the second quantized segment, . . . , and (index 45, index 46) corresponding to the fifth quantized segment.

For three quantized segments corresponding to CE level 0, index 47 to index 68 correspond to the first quantized segment, index 69 to index 90 correspond to the second quantized segment, and index 91 to index 113 correspond to the third quantized segment.

In an embodiment, downlink channel quality measurement values or channel quality value ranges where the downlink channel quality measurement values are located corresponding to N1 states among multiple states described by the N bits are not within the channel quality value range corresponding to the random access channel resource where the random access signal sent by the terminal is located, where N1 is an integer greater than or equal to 1 and N1 is less than or equal to N.

It should be noted that the N bits may describe 2^N states, and each state corresponds to a downlink channel quality measurement value or a specific value of the channel quality value range in which the downlink channel quality measurement value is located.

In an embodiment, the terminal determines, according to the coverage enhancement level, the number of downlink channel quality measurement values or the number of channel quality value ranges where the downlink channel quality measurement values are located sent in the second message.

For example, when the coverage enhancement level is greater than or equal to C1 (where C1 is a predetermined coverage enhancement level, and "predetermined" refers to being pre-stored in the base station and the terminal, or being notified to the terminal by the base station through signaling), the number of downlink channel quality measurement values or the number of channel quality value ranges where the downlink channel quality measurement values are located sent by the terminal is D1 (where D1 is greater than or equal to 2), for example, a total of three coverage enhancement levels are provided, and the indexes of them are 0, 1 and 2, respectively. Furthermore, C1=1 and D1=2. That is, the channel quality sent by the terminal with the coverage enhancement levels 1 and 2 is the RSRP and the downlink SINR, or the RSRP and the RSRQ.

When the coverage enhancement level is less than or equal to C2 (where C2 is a predetermined coverage enhancement level, and "predetermined" refers to being pre-stored in the base station and the terminal, or being notified to the terminal by the base station through signaling), the number of downlink channel quality measurement values or the number of channel quality value ranges where the downlink channel quality measurement values are located sent by the terminal is 1, for example, a total of three coverage enhancement levels are provided, and the indexes of them are 0, 1 and 2, respectively. Furthermore, C2=0. That is, the channel quality sent by the terminal with the coverage enhancement level 0 is the RSRP.

Alternatively, when the coverage enhancement level is less than or equal to C3 (where C3 is a predetermined coverage enhancement level, and "predetermined" refers to being pre-stored in the base station and the terminal, or being notified to the terminal by the base station through signaling), the number of downlink channel quality measurement values or the number of channel quality value ranges where the downlink channel quality measurement values are located sent by the terminal is D3 (where D3 is greater than or equal to 2), for example, a total of three coverage enhancement levels are provided, and the indexes of them are 0, 1 and 2, respectively. Furthermore, C3=0 and D3=2. That is, the channel quality sent by the terminal with the coverage enhancement level 0 is the RSRP and the downlink SINK, or the RSRP and the RSRQ.

When the coverage enhancement level is greater than or equal to C4 (where C4 is a predetermined coverage enhancement level, and "predetermined" refers to being pre-stored in the base station and the terminal, or being notified to the terminal by the base station through signaling), the number of downlink channel quality measurement values or the number of channel quality value ranges where the downlink channel quality measurement values are located sent by the terminal is 1, for example, a total of three coverage enhancement levels are provided, and the indexes of them are 0, 1 and 2, respectively. Furthermore, C4=1. That is, the channel quality sent by the terminal with the coverage enhancement levels 0 and 1 is the RSRP.

In an embodiment, the method further includes a step described below.

The terminal determines, according to the first message and in accordance with a predefined first rule or a predefined second rule, at least one of:

a coverage enhancement level;

repeated sending information of a channel, where the repeated sending information includes a repeated sending level or the number of repeated sending times;

modulation coding information of a channel, where the modulation coding information includes at least one of a modulation order or coding efficiency; or channel quality measurement information, where the channel quality measurement information includes a channel quality measurement value or a channel quality value range where a channel quality measurement value is located.

It should be noted that the channel here includes an uplink channel and a downlink channel.

In an embodiment, the first rule includes:

the terminal determining a first coverage enhancement level of the terminal according to a first channel quality measurement value and a first set of channel quality threshold values; and the terminal determining a second coverage enhancement level of the terminal according to a second channel quality measurement value and a second set of channel quality threshold values; or the terminal determining a value range of a first type of channel quality of the terminal according to the first channel quality measurement value and the first set of channel quality threshold values; and the terminal determining a value range of a second type of channel quality of the terminal according to the second channel quality measurement value and the second set of channel quality threshold values; or the terminal determining the coverage enhancement level of the terminal or the repeated sending information of the channel or the modulation coding information of the channel according to the first channel quality measurement value, the first set of channel quality threshold values, the second channel quality measurement value and the second set of channel quality threshold values.

In an embodiment, the method for determining the first coverage enhancement level of the terminal by the terminal according to the first channel quality measurement value and the first set of channel quality threshold values includes a step described below.

The first channel quality measurement value is compared with the corresponding first set of channel quality threshold values to determine the first coverage enhancement level of the terminal, where the channel quality corresponding to the first channel quality measurement value and the channel quality corresponding to the first set of channel quality threshold values belong to the same type, such as the RSRP.

The method for determining the second coverage enhancement level of the terminal by the terminal according to the second channel quality measurement value and the second set of channel quality threshold values is the same as the method described above.

In an embodiment, the method for determining the first coverage enhancement level of the terminal by the terminal according to the first channel quality measurement value and the first set of channel quality threshold values in the present application includes the following two cases: the terminal determines the first coverage enhancement level of the terminal merely according to two parameter values, the first channel quality measurement value and the first set of channel quality threshold values; the terminal determines the first coverage enhancement level of the terminal according to the first channel quality measurement value, the first set of channel quality threshold values, and values of other parameters.

In the present application, the method for determining the second coverage enhancement level of the terminal by the terminal according to the second channel quality measurement value and the second set of channel quality threshold values includes the following two cases: the terminal determines the second coverage enhancement level of the terminal merely according to two parameter values, the second channel quality measurement value and the second set of channel quality threshold values; the terminal determines the second coverage enhancement level of the terminal according to the second channel quality measurement value, the second set of channel quality threshold values, and values of other parameters.

For example, in an embodiment of the present application, the first set of channel quality threshold values is for the RSRP, and three RSRP value ranges are provided, i.e., RSRP value range 1, RSRP value range 2 and RSRP value range 3. The second set of channel quality threshold values is for the downlink SINR, and three downlink SINR value ranges are provided, i.e., downlink SINR value range 1, downlink SINR value range 2 and downlink SINR value range 3.

The coverage enhancement level of the terminal is obtained in the manner shown in Table 2.

TABLE 2

| Coverage enhancement level | RSRP value range | Downlink SINR value range |
|---|---|---|
| 0 | 0 | 0 |
| 1 | 0 | 1 |
| 2 | 0 | 2 |
| 3 | 1 | 0 |
| 4 | 1 | 1 |
| 5 | 1 | 2 |
| 6 | 2 | 0 |
| 7 | 2 | 1 |
| 8 | 2 | 2 |

The repeated sending level of the channel of the terminal is obtained in the manner shown in Table 3.

TABLE 3

| Repeated sending level of a channel | RSRP value range | Downlink SINR value range |
|---|---|---|
| 0 | 0 | 0 |
| 1 | 0 | 1 |
| 2 | 0 | 2 |
| 3 | 1 | 0 |
| 4 | 1 | 1 |
| 5 | 1 | 2 |
| 6 | 2 | 0 |
| 7 | 2 | 1 |
| 8 | 2 | 2 |

In an embodiment, the first rule further includes:

the terminal selecting a maximum coverage enhancement level from the first coverage enhancement level and the second coverage enhancement level as the coverage enhancement level of the terminal; or the terminal taking the first coverage enhancement level and the second coverage enhancement level as the coverage enhancement level of the terminal; or the terminal taking a maximum from an index of the selected value range of the first type of channel quality and an index of the selected value range of the second type of channel quality as the channel quality measurement information of the terminal; or the terminal taking the selected value range of the first type of channel quality and the selected value range of the second type of channel quality as the channel quality measurement information of the terminal.

It should be noted that in the case where the terminal takes the first coverage enhancement level and the second coverage enhancement level as the coverage enhancement level of the terminal, the first coverage enhancement level and the second coverage enhancement level are jointly indicated.

For example, the first coverage enhancement level is one from 0 to 2 and the second coverage enhancement level is one from 0 to 2, so that the manner of joint indication is as shown in Table 4. Each joint indication index corresponds to a coverage enhancement level or repeated sending information of an uplink channel, or corresponds to a coverage enhancement level or repeated sending information of a downlink channel.

TABLE 4

| Joint indication index | First coverage enhancement level | Second coverage enhancement level |
| --- | --- | --- |
| 0 | 0 | 0 |
| 1 | 0 | 1 |
| 2 | 0 | 2 |
| 3 | 1 | 0 |
| 4 | 1 | 1 |
| 5 | 1 | 2 |
| 6 | 2 | 0 |
| 7 | 2 | 1 |
| 8 | 2 | 2 |

In an embodiment, the first rule further includes:
the terminal taking the second coverage enhancement level as the coverage enhancement level of the terminal; or
the terminal taking the selected value range of the second type of channel quality as the downlink channel quality measurement information of the terminal.

It should be noted that the application scenario in which the terminal takes the second coverage enhancement level as the coverage enhancement level of the terminal is that the terminal uses a random access resource to indicate the value range of the RSRP when sending Msg1, and then indicates the value of the RSRQ or the value of the downlink SINR through the reported second coverage enhancement level. After the base station receives the above information, the base station may further adjust the coverage enhancement level of the terminal or the repeated sending information of the channel or the modulation coding information of the channel.

In an embodiment, the first rule further includes at least one of:
the terminal selecting corresponding repeated sending information of the downlink channel according to the coverage enhancement level;
the terminal selecting corresponding modulation coding information of the downlink channel according to the coverage enhancement level;
the terminal selecting the corresponding repeated sending information of the downlink channel according to channel quality measurement information of the downlink channel; or
the terminal selecting the corresponding modulation coding information of the downlink channel according to the channel quality measurement information of the downlink channel.

It should be noted that the step in which the terminal selects the corresponding repeated sending information of the downlink channel according to the coverage enhancement level in the present application includes the following two cases: the terminal selects the corresponding repeated sending information of the downlink channel merely according to the parameter value, the coverage enhancement level; the terminal selects the corresponding repeated sending information of the downlink channel according to the coverage enhancement level and values of other parameters.

In the present application, the step in which the terminal selects the corresponding modulation coding information of the downlink channel according to the coverage enhancement level includes the following two cases: the terminal selects the corresponding modulation coding information of the downlink channel merely according to the parameter value, the coverage enhancement level; the terminal selects the corresponding modulation coding information of the downlink channel according to the coverage enhancement level and values of other parameters.

In an embodiment, the second rule includes:
the terminal determining the first coverage enhancement level of the terminal according to the first channel quality measurement value and the first set of channel quality threshold values; the terminal belonging to the same first coverage enhancement level determining the second coverage enhancement level of the terminal according to the second channel quality measurement value and the second set of channel quality threshold values; and the terminal taking the second coverage enhancement level as the coverage enhancement level of the terminal, or taking the first coverage enhancement level and the second coverage enhancement level as the coverage enhancement level of the terminal; where the first coverage enhancement level and the second coverage enhancement level are independently indicated, or the first coverage enhancement level and the second coverage enhancement level are jointly indicated; or
the terminal determining the value range of the first type of channel quality of the terminal according to the first channel quality measurement value and the first set of channel quality threshold values; the terminal belonging to the same value range of the first type of channel quality determining the value range of the second type of channel quality of the terminal according to the second channel quality measurement value and the second set of channel quality threshold values; where the value range of the first type of channel quality of the terminal and the value range of the second type of channel quality of the terminal are independently indicated, or the value range of the first type of channel quality of the terminal and the value range of the second type of channel quality of the terminal are jointly indicated.

It should be noted that the joint indication described in the present application refers to a joint coding mode in which the first coverage enhancement level selected by the terminal and the second coverage enhancement level can be indicated through a piece of indication information.

For example, the first coverage enhancement level is one from 0 to 2 and the second coverage enhancement level is one from 0 to 2, so the manner of joint indication is as shown in Table 5 below.

TABLE 5

| Joint indication index | First coverage enhancement level | Second coverage enhancement level |
| --- | --- | --- |
| 0 | 0 | 0 |
| 1 | 0 | 1 |
| 2 | 0 | 2 |
| 3 | 1 | 0 |
| 4 | 1 | 1 |
| 5 | 1 | 2 |

TABLE 5-continued

| Joint indication index | First coverage enhancement level | Second coverage enhancement level |
|---|---|---|
| 6 | 2 | 0 |
| 7 | 2 | 1 |
| 8 | 2 | 2 |

In an embodiment of the present application, for such a manner of joint indication, for example, the first coverage enhancement level is one from 0 to 2 and the second coverage enhancement level is one from 0 to 1, so the manner of joint indication is as shown in Table 6.

TABLE 6

| Joint indication index | First coverage enhancement level | Second coverage enhancement level |
|---|---|---|
| 0 | 0 | 0 |
| 1 | 0 | 1 |
| 2 | 1 | 0 |
| 3 | 1 | 1 |
| 4 | 2 | 0 |
| 5 | 2 | 1 |

In an embodiment, the second rule further includes at least one of:
the terminal selecting corresponding repeated sending information of the channel according to the coverage enhancement level;
the terminal selecting corresponding modulation coding information of the channel according to the coverage enhancement level;
the terminal selecting the corresponding repeated sending information of the channel according to a downlink channel quality measurement value or a channel quality value range where a downlink channel quality measurement value is located; or
the terminal selecting the corresponding modulation coding information of the channel according to a downlink channel quality measurement value or a channel quality value range where a downlink channel quality measurement value is located.

In an embodiment, a channel quality corresponding to the first set of channel quality threshold values and a channel quality corresponding to the second set of channel quality threshold values belong to different types.

In an embodiment, the channel quality corresponding to the first set of channel quality threshold values is the RSRP, and the channel quality corresponding to the second set of channel quality threshold values is the RSRQ or the downlink SINR.

In an embodiment, the step in which the terminal determines the first coverage enhancement level of the terminal according to the first channel quality measurement value and the first set of channel quality threshold values includes a step of: comparing the first channel quality measurement value with the corresponding first set of channel quality threshold values to determine the first coverage enhancement level of the terminal. The channel quality corresponding to the first channel quality measurement value and the channel quality corresponding to the first set of channel quality threshold values belong to the same type (e.g., the RSRP).

In an embodiment, the step in which the terminal determines the second coverage enhancement level of the terminal according to the second channel quality measurement value and the second set of channel quality threshold values includes a step of: comparing the second channel quality measurement value with the corresponding second set of channel quality threshold values to determine the second coverage enhancement level of the terminal. The channel quality corresponding to the second channel quality measurement value and the channel quality corresponding to the second set of channel quality threshold values belong to the same type (e.g., the RSRP).

It should be noted that the step in which the terminal selects the corresponding repeated sending information of the downlink channel according to the coverage enhancement level in the present application includes the following two cases: the terminal selects the corresponding repeated sending information of the downlink channel merely according to the parameter value, the coverage enhancement level; the terminal selects the corresponding repeated sending information of the downlink channel according to the coverage enhancement level and values of other parameters.

In the present application, the step in which the terminal selects the corresponding modulation coding information of the downlink channel according to the coverage enhancement level includes the following two cases: the terminal selects the corresponding modulation coding information of the downlink channel merely according to the parameter value, the coverage enhancement level; the terminal selects the corresponding modulation coding information of the downlink channel according to the coverage enhancement level and values of other parameters.

In an embodiment, the method further includes a step described below.

The terminal transmits a third message through an uplink channel, where the third message includes at least one of:
a coverage enhancement level;
repeated sending information of a channel, where the repeated sending information includes a repeated sending level or the number of repeated sending times;
modulation coding information of a channel, where the modulation coding information includes at least one of a modulation order or coding efficiency; or
channel quality measurement information, where the channel quality measurement information includes a channel quality measurement value or a channel quality value range where a channel quality measurement value is located.

The terminal determines a value of a parameter in the third message through a predefined first rule or a predefined second rule.

In an embodiment, when the terminal satisfies a second condition, the terminal transmits the third message through an uplink channel.

The second condition includes at least one of the conditions described below.
(1) A system message or a broadcast message or a message sent to the terminal through a downlink channel includes an identity for enabling sending of the third message.
(2) The coverage enhancement level of the terminal is B, where B is one or more preset coverage enhancement levels.
(3) The coverage enhancement level of the terminal is greater than a preset coverage enhancement level threshold.
(4) The channel quality measurement value of the terminal is in a determined channel quality range.
(5) The number of sets of channel quality threshold values included in the first message is greater than 1.

In an embodiment, the second condition includes one of the following condition combinations:
condition combination I: (1) (2), (1) (3) or (1) (4);
condition combination II: (2) (4);
condition combination III: (3) (4); or
condition combination IV: (1) (2) (4) or (1) (3) (4).

(j) is the j-th piece of content included in the second condition, and j is a natural number from 1 to 5.

In an embodiment, specific setting methods of the first rule and the second rule are as described above and will not be described in detail here.

An embodiment of the present application further provides a terminal. The terminal includes a processor, a memory and a communication bus.

The communication bus is configured to implement connection communication between the processor and the memory.

The processor is configured to execute information transmission programs stored in the memory to implement any information transmission method described above.

An embodiment of the present application further provides a computer-readable storage medium. The computer-readable storage medium is configured to store one or more programs, where one or more processors are capable of executing the one or more programs to implement any information transmission method described above.

Referring to FIG. 3, an embodiment of the present application further provides an information transmission method. The method includes step 301 and step 302 described below.

In step 301, a terminal receives a first message sent by a base station, where the first message includes at least one of: at least one set of channel quality threshold values, where each set of channel quality threshold values includes at least one channel quality threshold value; or a deviation value relative to the channel quality threshold value.

The channel quality threshold value is set according to at least one following type of channel quality: reference signal receiving power, a reference signal receiving quality, a downlink signal to interference plus noise ratio, a downlink signal to noise ratio, an uplink signal to interference plus noise ratio, an uplink signal to noise ratio, a downlink path loss, or an uplink path loss.

In step 302, (other signaling interactions may exist between step 301 and step 302, which is not limited here) the terminal sends a random access preamble, Msg1 message, where the Msg1 message includes at least one first structure.

The first structure includes at least one symbol group.

A symbol group of the first structure includes a cyclic prefix and at least one symbol, or includes a cyclic prefix, at least one symbol, and guard time.

Each symbol in the same symbol group of the first structure occupies the same subcarrier in the frequency domain.

In an embodiment, the first structure includes four symbol groups, where a subcarrier index occupied by a first symbol group and a subcarrier index occupied by a second symbol group differ by one subcarrier, and a subcarrier index occupied by a third symbol group and a subcarrier index occupied by a fourth symbol group differ by six subcarriers.

In an embodiment, the first structure includes three symbol groups, where a subcarrier index occupied by a first symbol group and a subcarrier index occupied by a second symbol group differ by one subcarrier, and a subcarrier index occupied by the second symbol group and a subcarrier index occupied by a third symbol group differ by six subcarriers.

In an embodiment, when the first structure includes four symbol groups, the first symbol group and the second symbol group are consecutive in the time domain, the third symbol group and the fourth symbol group are consecutive in the time domain, and the second symbol group and the third symbol group are discrete in the time domain.

In an embodiment, when the first structure includes three symbol groups, the first symbol group, the second symbol group, and the third symbol group are consecutive in the time domain.

In an embodiment, when the Msg1 message includes multiple first structures and the first structure includes three symbol groups, a subcarrier index occupied by a first symbol group in a first structure having an odd index is selected from a first subcarrier set; and a subcarrier index occupied by a first symbol group in a first structure having an even index is selected from a second subcarrier set.

The number of subcarriers included in the first subcarrier set is 12. In an embodiment, the 12 subcarriers are consecutive in the frequency domain and have index numbers 0 to 11.

The second subcarrier set is determined according to one of the rules described below.

When a subcarrier index occupied by a first symbol group in a first structure having an odd index before the first structure having the even index is one of indexes {0, 2, 4} in the first subcarrier set, the second subcarrier set includes subcarriers having indexes {7, 9, 11} in the first subcarrier set.

When a subcarrier index occupied by a first symbol group in a first structure having an odd index before the first structure having the even index is one of indexes {6, 8, 10} in the first subcarrier set, the second subcarrier set includes subcarriers having indexes {1, 3, 5} in the first subcarrier set.

When a subcarrier index occupied by a first symbol group in a first structure having an odd index before the first structure having the even index is one of indexes {1, 3, 5} in the first subcarrier set, the second subcarrier set includes subcarriers having indexes {6, 8, 10} in the first subcarrier set.

When a subcarrier index occupied by a first symbol group in a first structure having an odd index before the first structure having the even index is one of indexes {7, 9, 11} in the first subcarrier set, the second subcarrier set includes subcarriers having indexes {0, 2, 4} in the first subcarrier set.

It should be noted that the index of the first one of the first structures is defined as 1, the index of the second one of the first structures is defined as 2, and so on. Thus, the first structures having odd indexes are the first one, the third one, the fifth one, the seventh one . . . of the first structures, and the first structures having even indexes are the second one, the fourth one, the sixth one . . . of the first structures.

In an embodiment, when the Msg1 message includes multiple first structures and the first structure includes four symbol groups, a subcarrier index occupied by a first symbol group in a first structure having an odd index is selected from a third subcarrier set; a subcarrier index occupied by a third symbol group in the first structure having the odd index is selected from a fourth subcarrier set; a subcarrier index occupied by a first symbol group in a first structure having an even index is selected from a fifth subcarrier set; and a subcarrier index occupied by a third symbol group in the first structure having the even index is selected from a sixth subcarrier set.

The number of subcarriers included in the third subcarrier set is 12. In an embodiment, the 12 subcarriers are consecutive in the frequency domain and have index numbers 0 to 11.

The number of subcarriers included in the fourth subcarrier set is 12. In an embodiment, the 12 subcarriers are consecutive in the frequency domain and have index numbers 0 to 11.

The fifth subcarrier set is determined according to one of the rules described below.

When a subcarrier index occupied by a first symbol group in a first structure having an odd index before the first structure having the even index is a subcarrier having an even index in the third subcarrier set, the fifth subcarrier set includes subcarriers having odd indexes in the third subcarrier set.

When a subcarrier index occupied by a first symbol group in a first structure having an odd index before the first structure having the even index is a subcarrier having an odd index in the third subcarrier set, the fifth subcarrier set includes subcarriers having even indexes in the third subcarrier set.

The sixth subcarrier set is determined according to the following: when a subcarrier index occupied by a third symbol group in a first structure having an odd index before the first structure having the even index is a subcarrier having an index of {0, 1, 2, 3, 4, 5} in the fourth subcarrier set, the sixth subcarrier set includes subcarriers having indexes {6, 7, 8, 9, 10, 11} in the fourth subcarrier set.

In an embodiment, the third subcarrier set and the fourth subcarrier set are configured independently.

The third subcarrier set is the same as the fourth subcarrier set.

A subcarrier index occupied by a first symbol group in a first structure having an odd index is randomly selected from the third subcarrier set.

A subcarrier index occupied by a third symbol group in a first structure having an odd index is randomly selected from the fourth subcarrier set.

A subcarrier index occupied by a first symbol group and a subcarrier index occupied by a third symbol group in a first structure having an odd index are independently selected.

An embodiment of the present application further provides a terminal. The terminal includes a processor, a memory and a communication bus.

The communication bus is configured to implement connection communication between the processor and the memory.

The processor is configured to execute information transmission programs stored in the memory to implement any information transmission method described above.

An embodiment of the present application further provides a computer-readable storage medium. The computer-readable storage medium is configured to store one or more programs, where one ore more processors are capable of executing the one or more programs to implement any information transmission method described above.

Referring to FIG. 4, an embodiment of the present application further provides an information transmission method. The method includes step 401 described below.

In step 401, a base station sends an RAR, Msg2 message, through a downlink channel, where the Msg2 message at least includes a MAC header and MAC payload.

The adjustment information of Msg1 is sent in the Msg2 message.

In an embodiment, when BI information is included in the MAC subheader, the adjustment information of Msg1 is sent in the MAC payload.

In an embodiment, when MAC RAR exists in the MAC payload, the adjustment information of Msg1 is sent after the last MAC RAR.

In an embodiment, the adjustment information of Msg1 includes at least one of:
an adjusted coverage enhancement level;
the adjusted number of repeated sending times or an adjusted repeated sending level of Msg1;
an adjusted initial target received power value of Msg1;
an adjusted beam direction or an adjusted beam index selected for sending Msg1;
adjusted index information of an SS/PBCH block of resource configuration information of Msg1;
an adjustment amount of a coverage enhancement level;
an adjustment amount of the number of repeated sending times or an adjustment amount of a repeated sending level of Msg1;
an adjustment amount of an initial target received power value of Msg1;
an adjustment amount of a selected beam direction or an adjustment amount of a selected beam index for sending Msg1; or
an adjustment amount of index information of an SS/PBCH block of resource configuration information of Msg1.

It should be noted that the specific meaning of the SS/PBCH block is a time domain-frequency domain resource block that includes at least an SS and an SIB. The SIB is sent in a PBCH. The system may be configured with one or more SS/PBCH blocks.

In an embodiment, Msg1 resource configuration information exists in each SS/PBCH block among the configured one or more SS/PBCH blocks.

In an embodiment, Msg1 resource configuration information exists in part of the SS/PBCH blocks among the configured one or more SS/PBCH blocks.

The meaning of the adjustment amount in the present application is as follows: the adjustment amount of a certain parameter is a deviation value between a value of the parameter in the last time and a value of the parameter after adjustment, where the adjustment amount may be positive, negative, or zero.

In an embodiment, the adjustment information of Msg1 is for the same coverage enhancement level.

In an embodiment, the adjustment information of Msg1 is indicated by an RAPID field in the MAC subheader.

Figure 11:
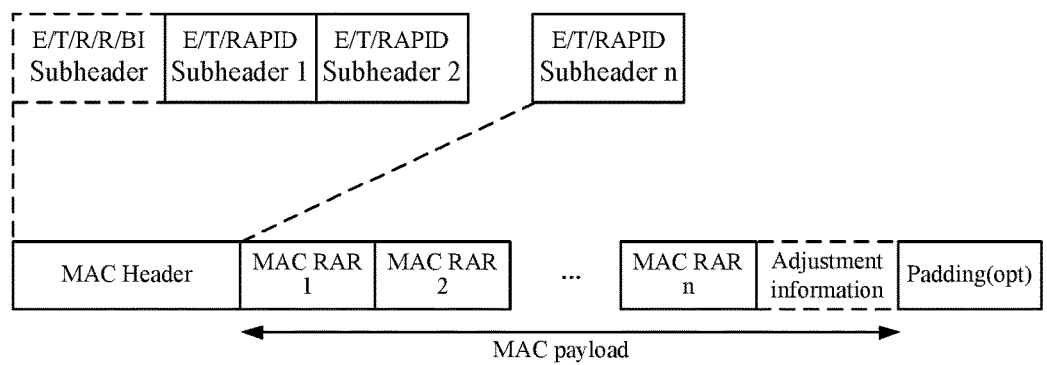
FIG. 11 is a schematic diagram illustrating a first resource position occupied by adjustment information of Msg1 according to an embodiment of the present application.
Figure 12:
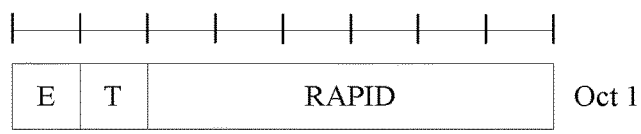
FIG. 12 is a structural diagram of an E/T/Random Access Preamble Identity (RAPID) MAC subheader in the related art.
Figure 13:
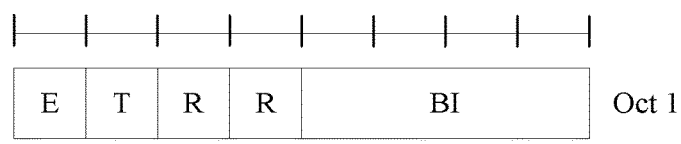
FIG. 13 is a structural diagram of an E/T/R/R/Backoff Indicator (BI) MAC subheader in the related art.

Referring to FIG. 11, two MAC subheader (subheader of the MAC layer) structures are included in FIG. 11, and the two MAC subheader structures are "E/T/RAPID MAC subheader" as shown in FIG. 12 and having the length of 8 bits, and "E/T/R/R/BI MAC subheader" as shown in FIG. 13 and having the length of 8 bits, respectively.

The meaning of multiple variables is as follows.

"E" is used for indicating whether the MAC subheader is followed by other subheaders. That "E" is configured as "1" indicates that the MAC subheader is followed by other subheaders. That "E" is configured as "0" indicates that the subheader is directly followed by the MAC RAR or padding bits.

"T" is used for indicating whether the subheader includes an RAPID or a BI. That "T" is configured as "1" indicates that the subheader includes the RAPID. That "T" is configured as "0" indicates that the subheader includes the BI.

"R" is a reserved bit and configured as "0".

The BI occupies 4 bits; the RAPID occupies 6 bits.

In an embodiment, the step of indicating the adjustment information of Msg1 through the RAPID field in the MAC subheader includes: indicating the adjustment information of Msg1 by using part or all of the state bits of the RAPID.

It should be noted that the specific meaning of the state bit is as follows: assuming that the RAPID is formed by N bits, the RAPID may describe up to $2^N$ states, where each state is called a state bit.

For example, when N=6, the RAPID has 6 bits and a total of 64 state bits 0 to 63 may be supported. 0 to 47 are used for indicating NPRACH subcarrier indexes, and then a total of 16 state bits 48 to 63 are idle.

The 16 state bits of the RAPID may indicate "adjustment information of Msg1". For example, each state bit corresponds to a type of adjustment information of Msg1, and the UE learns the adjustment information of Msg1 after successfully receiving the above state bits.

In an embodiment, the MAC subheader indicating the adjustment information of Msg1 is sent after the MAC subheader including BI information.

In an embodiment, the step of indicating the adjustment information of the Msg1 through the RAPID in the MAC subheader includes: using a state bit of the RAPID for indicating whether the adjustment information of the Msg1 message is included in the MAC payload.

In an embodiment, when the state bit of the RAPID indicates that the adjustment information of the Msg1 is included in the MAC payload, the adjustment information of Msg1 is sent after the MAC header.

In an embodiment, when the state bit of the RAPID indicates that the adjustment information of the Msg1 is included in the MAC payload and that the MAC RAR exists in the MAC payload, the adjustment information of the Msg1 is sent after the last MAC RAR in the MAC payload.

In an embodiment, the adjustment information of Msg1 is for the same coverage enhancement level.

An embodiment of the present application further provides a base station. The base station includes a processor, a memory and a communication bus.

The communication bus is configured to implement connection communication between the processor and the memory.

The processor is configured to execute information transmission programs stored in the memory to implement any information transmission method described above.

An embodiment of the present application further provides a computer-readable storage medium. The computer-readable storage medium is configured to store one or more programs, where one or more processors are capable of executing the one or more programs to implement any information transmission method described above.

According to the information transmission method, the base station, the terminal and the computer-readable storage medium provided by one or more embodiments of the present application, the base station sends the first message including the channel quality threshold value or the deviation value thereof, so that the terminal can adjust the coverage enhancement level of the terminal according to the current channel quality measurement value and feed back the adjusted coverage enhancement level to the base station, thereby improving the success rate of uplink channel transmission, and improving the phenomenon that the base station may select too large a number of repeated sending times of the downlink channel to cause the waste of resources. The embodiments of the present application further provide several application embodiments to further explain the present application. However, it should be noted that the application embodiments are merely used for better describing the present application and do not limit the present application in any improper way. The following embodiments may exist independently, and technical features of different embodiments may be combined into one embodiment for joint use.

Application Embodiment One (Combination 1: One Set of Channel Quality Threshold Values and a Deviation Value for Channel Quality Threshold Values in the One Set of Channel Quality Threshold Values)

Three coverage enhancement levels are supported in the wireless communication system, each coverage enhancement level corresponds to a channel quality value range, and a channel corresponding to each coverage enhancement level is configured with a number of repeated sending times.

When CQ_Measured satisfies that, CQ_Measured≥CQ_TH_CE0, the coverage enhancement level of the UE is CE level 0.

When CQ_Measured satisfies that CQ_TH_CE1≤CQ_Measured<CQ_TH_CE0, the coverage enhancement level of the UE is CE level 1.

When CQ_Measured satisfies that CQ_Measured<CQ_TH_CE1, the coverage enhancement level of the UE is CE level 2.

CQ_Measured is a channel quality measurement value of the UE, CQ_TH_CE0 is the channel quality threshold value corresponding to the coverage enhancement level 0, and CQ_TH_CE1 is the channel quality threshold value corresponding to the coverage enhancement level 1.

It should be noted that the channel quality threshold value is used for the following: the terminal determines the coverage enhancement level or the coverage enhancement level of a downlink channel or a repeated sending level of the downlink channel or the number of repeated sending times of the downlink channel according to a comparison result of the channel quality measurement value and the channel quality threshold value.

The channel quality threshold value is set according to at least one following type of channel quality: reference signal receiving power, a reference signal receiving quality, a downlink signal to interference plus noise ratio, a downlink signal to noise ratio, an uplink signal to interference plus noise ratio, an uplink signal to noise ratio, a downlink path loss, or an uplink path loss.

In the application embodiment, the channel quality is the RSRP.

Considering that the CE level reflects the downlink channel quality information, the CE level may also reflect the uplink channel quality information when an interference level experienced by the uplink channel is equal to or close to an interference level experienced by the downlink channel. In the embodiment, the interference level experienced by the uplink channel is greater than the interference level experienced by the downlink channel, so if the UE sends the uplink channel according to the number of repeated sending times corresponding to the selected CE level, the uplink channel cannot be successfully received by the base station because the uplink interference level is too high.

In the embodiment, in addition to configuring one set of channel quality threshold values (i.e., CQ_TH_CE0 and CQ_TH_CE1), the base station also configures deviation values Delta0 and Delta1 for CQ_TH_CE0 and CQ_TH_CE1 as shown in FIG. 5. Therefore, the channel quality is divided into five ranges, i.e., Range 1 to Range 5. It should be noted that the deviation values Delta0 and Delta1 may be configured for multiple threshold values in each set of threshold values, or all threshold values in the set of threshold values share the same deviation value.

The base station increases the channel quality threshold values corresponding to CE level 0 and CE level 1 through configuring Delta0 and Delta1. Therefore, the channel quality threshold value of CE level 0 becomes CQ_TH_CE0+Delta0, and the channel quality range corresponding to CE level 0 is Range 1; the channel quality threshold value of CE level 1 becomes CQ_TH_CE1+Delta1, and the channel quality ranges corresponding to CE level 1 are Range 2 and Range 3; the channel quality ranges corresponding to CE level 2 are Range 4 and Range 5.

Because the channel quality threshold value corresponding to the CE level is increased, the success rate of uplink channel transmission can be improved. However, the CE levels selected by some UEs are large, so that the numbers of repeated sending times of downlink channels corresponding to the UEs are large, and the waste of resources is caused. For example, after the channel quality threshold value is increased, the CE level corresponding to the UE whose channel quality is in the Range 2 area is increased from CE level 0 to CE level 1, so that the base station performs selection according to CE level 1 when configuring the numbers of repeated sending times of the downlink channels for such UEs. Thus, the waste of resources is caused due to the large numbers of repeated sending times of the downlink channels corresponding to the UEs. Such a problem of the waste of resources also exists for UEs in the Range 4 area. To overcome this problem, the UE transmits adjustment information of a downlink channel through an Msg3 message.

The adjustment information of a downlink channel includes at least one of:

adjusted repeated sending information of a downlink channel;
  adjusted modulation coding information of a downlink channel;
  an adjustment amount of repeated sending information of a downlink channel;
  an adjustment amount of modulation coding information of a downlink channel; or
  a downlink channel quality.

When the adjustment information of the downlink channel includes the downlink channel quality, the method described below is used for quantizing the "downlink channel quality".

(1) A value range of the "downlink channel quality" sent by the UE is a channel quality range corresponding to the CE level selected by the UE.

(2) The channel quality range in (1) is quantized by N (where N is greater than or equal to 1) bits, that is, the channel quality range corresponding to the CE level is divided into $2^N$ small ranges, and the UE sends an index of the small range where the "downlink channel quality" is located through the Msg3 message.

In the embodiment, when the channel quality measurement value of the UE is located in at least one of the following areas, the UE sends the downlink channel quality:

the Range 2 area;
  the Range 4 area;
  the Range 2 area and the Range 3 area;
  the Range 4 area and the Range 5 area; or
  the Range 2 area, the Range 3 area, the Range 4 area and the Range 5 area.

Application Embodiment Two (Combination 1: One Set of Channel Quality Threshold Values and a Deviation Value for Channel Quality Threshold Values in the One Set of Channel Quality Threshold Values)

In the embodiment, in addition to configuring one set of channel quality threshold values (i.e., CQ_TH_CE0 and CQ_TH_CE1), the base station also configures deviation values Delta® and Delta1 for CQ_TH_CE0 and CQ_TH_CE1 as shown in FIG. 5. Therefore, the channel quality is divided into five ranges, i.e., Range 1 to Range 5.

The base station increases the channel quality threshold values corresponding to CE level 0 and CE level 1 through configuring Delta0 and Delta1. Therefore, the channel quality threshold value of CE level 0 becomes CQ_TH_CE0+Delta0, and the channel quality range corresponding to CE level 0 is Range 1; the channel quality threshold value of CE level 1 becomes CQ_TH_CE1+Delta1, and the channel quality ranges corresponding to CE level 1 are Range 2 and Range 3, and the corresponding repeated sending levels or numbers of repeated sending times of the uplink channel (a random access channel in the embodiment) are the same; the channel quality ranges corresponding to CE level 2 are Range 4 and Range 5, and the corresponding repeated sending levels or numbers of repeated sending times of the uplink channel (the random access channel in the embodiment) are the same.

Because the channel quality threshold value corresponding to the CE level is increased, the success rate of uplink channel transmission can be improved. However, the CE levels selected by some UEs are larger, so that the numbers of repeated sending times of downlink channels corresponding to the UEs are larger, and the waste of resources is caused. In order to overcome this problem, each range among Range 1 to Range 5 corresponds to an independent random access channel resource, and the number of repeated sending times or the repeated sending level of the downlink channel corresponding to each range is independently configured.

The random access channel resource includes at least one of:

a time domain-frequency domain resource occupied by a random access channel;
  a sequence for sending a random access signal;
  a beam direction or beam index selected for sending a random access signal; or
  index information of an SS/PBCH block including configuration information of a random access channel resource.

The downlink channel includes at least one of:

a downlink channel used when a random access response message is sent;
  a downlink channel used when scheduling information of a random access response message is sent;
  a downlink channel when Msg4 is sent; or
  a downlink channel used when scheduling information of Msg4 is sent.

The base station determines, according to the random access channel resource corresponding to the received random access signal sent by the UE, an index of the range of the UE, and further configures the number of repeated sending times or the repeated sending level for the downlink channel corresponding to the UE.

Application Embodiment Three (Combination 2: Two Sets of Channel Quality Threshold Values)

Considering that the CE level reflects the downlink channel quality information, the CE level may also reflect the uplink channel quality information when the interference level experienced by the uplink channel is equal to or close to the interference level experienced by the downlink channel. In the embodiment, the interference level experienced by the uplink channel is greater than the interference level experienced by the downlink channel, so if the UE sends the uplink channel according to the number of repeated sending times corresponding to the selected CE level, the uplink channel cannot be successfully received by the base station because the uplink interference level is too high. In order to overcome this problem, in the embodiment, the base station configuring two sets of channel quality threshold values, where the first set of threshold values includes CQ_TH_CE0 and CQ_TH_CE1, and the second set of threshold values includes New_CQ_TH_CE0 and New_CQ_TH_CE1. As shown in FIG. 6, the channel quality is divided into a total of five ranges, i.e., Range 1 to Range 5, through the two sets of threshold values.

The channel quality threshold value of uplink CE level 0 is New_CQ_TH_CE0, and the channel quality range corresponding to uplink CE level 0 is Range 1; the channel quality threshold value of uplink CE level 1 becomes New_CQ_TH_CE1, and the channel quality ranges corresponding to uplink CE level 1 are Range 2 and Range 3; the channel quality ranges corresponding to uplink CE level 2 are Range 4 and Range 5.

The channel quality threshold value of downlink CE level 0 is CQ_TH_CE0, and the channel quality ranges corresponding to downlink CE level 0 are Range 1 and Range 2; the channel quality threshold value of downlink CE level 1 becomes CQ_TH_CE1, and the channel quality ranges corresponding to downlink CE level 1 are Range 3 and Range 4; the channel quality range corresponding to downlink CE level 2 is Range 5.

Because the channel quality threshold value corresponding to the uplink CE level is increased, the success rate of uplink channel transmission can be improved.

Application Embodiment Four (Combination 2: Two Sets of Channel Quality Threshold Values)

In the embodiment, the base station configuring two sets of channel quality threshold values, where the first set of threshold values includes CQ_TH_CE0 and CQ_TH_CE1, and the second set of threshold values includes New_CQ_TH_CE0 and New_CQ_TH_CE1. As shown in FIG. 6, the channel quality is divided into a total of five ranges, i.e., Range 1 to Range 5, through the two sets of threshold values.

The channel quality threshold value of uplink CE level 0 is New_CQ_TH_CE0, and the channel quality range corresponding to uplink CE level 0 is Range 1; the channel quality threshold value of uplink CE level 1 becomes New_CQ_TH_CE1, and the channel quality ranges corresponding to uplink CE level 1 are Range 2 and Range 3; the channel quality ranges corresponding to uplink CE level 2 are Range 4 and Range 5.

The channel quality threshold value of downlink CE level 0 is CQ_TH_CE0, and the channel quality ranges corresponding to downlink CE level 0 are Range 1 and Range 2; the channel quality threshold value of downlink CE level 1 becomes CQ_TH_CE1, and the channel quality ranges corresponding to downlink CE level 1 are Range 3 and Range 4; the channel quality range corresponding to downlink CE level 2 is Range 5.

Because the channel quality threshold value corresponding to the uplink CE level is increased, the success rate of uplink channel transmission can be improved. In the embodiment, each range among Range 1 to Range 5 corresponds to an independent random access channel resource, and the number of repeated sending times or the repeated sending level of the downlink channel corresponding to each range is independently configured.

The random access channel resource includes at least one of:
a time domain-frequency domain resource occupied by a random access channel;
a sequence for sending a random access signal;
a beam direction or beam index selected for sending a random access signal; or
index information of an SS/PBCH block including configuration information of a random access channel resource.

The downlink channel includes at least one of:
a downlink channel used when a random access response message is sent;
a downlink channel used when scheduling information of a random access response message is sent;
a downlink channel when Msg4 is sent; or
a downlink channel used when scheduling information of Msg4 is sent.

According to the range in which the measured channel quality value is located, the UE selects a corresponding random access channel resource to send a random access signal. The base station determines an index of the range of the UE according to the random access channel resource corresponding to the received random access signal sent by the UE, and further configures the corresponding number of repeated sending times or repeated sending level of the downlink channel for the UE.

Applicaton Embodiment Five (Combination 2: Channel Qualities Corresponding to Two Sets of Channel Quality Threshold Values Belong to Different Types)

In the embodiment, two sets of channel quality threshold values are configured, the used channel qualities are RSRP and downlink SINR, respectively, and each set of channel quality threshold values corresponds to three coverage enhancement levels.

In the embodiment, the UE determines the coverage enhancement level by the rules described below.
(1) The UE determines that the coverage enhancement level of the UE is level 0 according to an RSRP measurement value and a corresponding RSRP threshold value.
(2) The UE determines that the coverage enhancement level of the UE is level 1 according to a downlink SINR measurement value and a corresponding downlink SINR threshold value.
(3) The UE selects the maximum coverage enhancement level from coverage enhancement level 0 and coverage enhancement level 1 as the coverage enhancement level selected by the UE, i.e., the UE selects coverage enhancement level 1 as the coverage enhancement level selected by the UE.

In the embodiment, the UE may further select corresponding repeated sending information of the downlink channel according to the selected coverage enhancement level.

In the embodiment, the UE may further select corresponding modulation coding information of the downlink channel according to the coverage enhancement level.

In the embodiment, the UE transmits adjustment information through the Msg3 message, where the adjustment information includes at least one of:
a coverage enhancement level;
repeated sending information of a downlink channel, where the repeated sending information includes a repeated sending level or the number of repeated sending times; or modulation coding information of a downlink channel, where the modulation coding information includes at least one of a modulation order or coding efficiency.

The downlink channel at least includes a downlink control channel and a downlink shared channel, for example, a downlink control channel carrying scheduling information of Msg2 or scheduling information of Msg4, and a downlink shared channel carrying Msg2 or Msg4.

In the embodiment, in the adjustment information transmitted in the Msg3 message, the coverage enhancement level may be an actually selected coverage enhancement level, or a deviation value of the actually selected coverage enhancement level from the last coverage enhancement level, where the deviation value may be positive, negative, or zero.

In the embodiment, in the adjustment information transmitted in the Msg3 message, the repeated sending information of the downlink channel may be an actually selected value, or a deviation value of an actually selected value from the last selected value, where the deviation value may be positive, negative, or zero.

In the embodiment, in the adjustment information transmitted in the Msg3 message, the modulation code information of the downlink channel may be an actually selected value, or a deviation value of an actually selected value from the last selected value, where the deviation value may be positive, negative, or zero.

In addition to the embodiment, the UE may also determine the coverage enhancement level according to the rules described below.

(1) The UE determines that the coverage enhancement level of the UE is level 0 according to the RSRP measurement value and the corresponding RSRP threshold value.

(2) The UE determines that the coverage enhancement level of the UE is level 1 according to the RSRQ measurement value and the corresponding RSRQ threshold value.

(3) The UE selects the maximum coverage enhancement level from coverage enhancement level 0 and coverage enhancement level 1 as the coverage enhancement level selected by the UE, i.e., the UE selects coverage enhancement level 1 as the coverage enhancement level selected by the UE.

Application Embodiment Six (Combination 2: Channel Qualities Corresponding to Two Sets of Channel Quality Threshold Values Belong to Different Types)

In the embodiment, the UE determines the coverage enhancement level by the rules described below.

The UE determines a large coverage enhancement level of the UE according to the RSRP measurement value and the corresponding RSRP threshold value.

When CQ_Measured satisfies that CQ_Measured≥CQ_TH_CE0, the large coverage enhancement level of the UE is large level 0.

When CQ_Measured satisfies that CQ_TH_CE1≤CQ_Measured<CQ_TH_CE0, the large coverage enhancement level of the UE is large level 1.

When CQ_Measured satisfies that CQ_Measured<CQ_TH_CE1, the large coverage enhancement level of the UE is large level 2.

CQ_Measured is the RSRP measurement value of the UE, CQ_TH_CE0 is the RSRP threshold value corresponding to the large coverage enhancement level 0, and CQ_TH_CE1 is the RSRP threshold value corresponding to the large coverage enhancement level 1.

CQ_TH_CE0 and CQ_TH_CE1 belong to one set of channel quality threshold values.

After the UE selects the large coverage enhancement level, the UE determines the small coverage enhancement level of the UE according to the downlink SINR measurement value and the corresponding downlink SINR threshold value.

In the embodiment, two small coverage enhancement levels are configured in each large coverage enhancement level, and the configured threshold value is SINR_TH_CE0. The small coverage enhancement level 0 is defined when the downlink SINR of the UE is greater than or equal to SINR_TH_CE0, and the small coverage enhancement level 1 is defined when the downlink SINR of the UE is less than SINR_TH_CE0.

The UE takes the "large coverage enhancement level and small coverage enhancement level" as coverage enhancement level information selected by the UE; where the "large coverage enhancement level" and the "small coverage enhancement level" may be independently indicated or jointly indicated. The joint indication refers to a joint coding mode in which the "large coverage enhancement level" selected by the terminal and the "small coverage enhancement level" may be indicated through a piece of indication information.

In the embodiment, the UE transmits adjustment information through the Msg3 message, where the adjustment information includes at least one of:

a coverage enhancement level;

repeated sending information of a downlink channel, where the repeated sending information includes a repeated sending level or the number of repeated sending times; or modulation coding information of a downlink channel, where the modulation coding information includes at least one of a modulation order or coding efficiency.

The downlink channel at least includes a downlink control channel and a downlink shared channel, for example, a downlink control channel carrying scheduling information of Msg2 or scheduling information of Msg4, and a downlink shared channel carrying Msg2 or Msg4.

Application Embodiment Seven (Combination 3: One Set of Channel Quality Threshold Values)

Considering that the CE level reflects the downlink channel quality information, the CE level may also reflect the uplink channel quality information when the interference level experienced by the uplink channel is equal to or close to the interference level experienced by the downlink channel. In the embodiment, the interference level experienced by the uplink channel is greater than the interference level experienced by the downlink channel, so if the UE sends the uplink channel according to the number of repeated sending times corresponding to the selected CE level, the uplink channel cannot be successfully received by the base station because the uplink interference level is too high.

In the embodiment, the base station increases the channel quality threshold values corresponding to CE level 0 and CE level 1. As shown in FIG. 6, the channel quality threshold value of CE level 0 is increased from the originally configured CQ_TH_CE0 to New_CQ_TH_CE0, and the channel quality threshold value of CE level 1 is increased from the originally configured CQ_TH_CE1 to New_CQ_TH_CE1. The base station sends the new threshold values New_CQ_TH_CE0 and New_CQ_TH_CE1 to the UE.

Because the channel quality threshold value corresponding to the CE level is increased, the success rate of uplink channel transmission can be improved. However, the CE levels selected by some UEs are large, so that the numbers of repeated sending times of downlink channels corresponding to the UEs are large, and the waste of resources is caused. For example, after the channel quality threshold value is increased, the CE level corresponding to the UE whose channel quality is in the Range 2 area is increased from CE level 0 to CE level 1, so that the base station performs selection according to CE level 1 when configuring the numbers of repeated sending times of the downlink channels for such UEs. Thus, the waste of resources is caused due to the large numbers of repeated sending times of the downlink channels corresponding to the UEs. Such a problem of the waste of resources also exists for UEs in the Range 4 area. In order to overcome this problem, the UE transmits adjustment information of a downlink channel through an Msg3 message.

The adjustment information of a downlink channel includes at least one of:

adjusted repeated sending information of a downlink channel, where the repeated sending information includes a repeated sending level or the number of repeated sending times;

adjusted modulation coding information of a downlink channel;

an adjustment amount of repeated sending information of a downlink channel;

an adjustment amount of modulation coding information of a downlink channel; or channel quality measurement information of a downlink channel, where the channel quality measurement information includes a channel quality measurement value or a channel quality value range where a channel quality measurement value is located.

When the adjustment information of the downlink channel includes the downlink channel quality, the method described below is used for quantizing the "downlink channel quality".

(1) A value range of the "downlink channel quality" sent by the UE is a channel quality range corresponding to the CE level selected by the UE.

(2) The channel quality range in (1) is quantized by N (where N is greater than or equal to 1) bits, that is, the channel quality range corresponding to the CE level is divided into 2^N small ranges, and the UE sends an index of the small range where the "downlink channel quality" is located through the Msg3 message.

In the embodiment, the channel quality measurement value of the UE is located in at least one of the following areas:

the Range 2 area;
the Range 4 area;
the Range 2 area and the Range 3 area;
the Range 4 area and the Range 5 area; or
the Range 2 area, the Range 3 area, the Range 4 area and the Range 5 area.

Application Embodiment Eight (Combination 3: One Set of Channel Quality Threshold Values)

In the embodiment, the base station increases the channel quality threshold values corresponding to CE level 0 and CE level 1. As shown in FIG. 6, the channel quality threshold value of CE level 0 is increased from the originally configured CQ_TH_CE0 to New_CQ_TH_CE0, and the channel quality threshold value of CE level 1 is increased from the originally configured CQ_TH_CE1 to New_CQ_TH_CE1. The base station sends the new threshold values New_CQ_TH_CE0 and New_CQ_TH_CE1 to the UE.

Because the channel quality threshold value corresponding to the CE level is increased, the success rate of uplink channel transmission can be improved. However, the CE levels selected by some UEs are large, so that the numbers of repeated sending times of downlink channels corresponding to the UEs are large, and the waste of resources is caused. For example, after the channel quality threshold value is increased, the CE level corresponding to the UE whose channel quality is in the Range 2 area is increased from CE level 0 to CE level 1, so that the base station performs selection according to CE level 1 when configuring the numbers of repeated sending times of the downlink channels for such UEs. Thus, the waste of resources is caused due to the large numbers of repeated sending times of the downlink channels corresponding to the UEs. Such a problem of the waste of resources also exists for UEs in the Range 4 area. In order to overcome this problem, each range among Range 1 to Range 5 corresponds to an independent random access channel resource, and the number of repeated sending times or the repeated sending level of the downlink channel corresponding to each range is independently configured.

The random access channel resource includes at least one of:

a time domain-frequency domain resource occupied by a random access channel;

a sequence for sending a random access signal;

a beam direction or beam index selected for sending a random access signal; or index information of an SS/PBCH block including configuration information of a random access channel resource.

The downlink channel includes at least one of:

a downlink channel used when a random access response message is sent;

a downlink channel used when scheduling information of a random access response message is sent;

a downlink channel when Msg4 is sent; or a downlink channel used when scheduling information of Msg4 is sent.

According to the range in which the measured channel quality value is located, the UE selects a corresponding random access channel resource to send a random access signal. The base station determines an index of the range of the UE according to the random access channel resource corresponding to the received random access signal sent by the UE, and further configures the corresponding repeated sending information of the downlink channel for the UE.

Application Embodiment Nine (Handling Some Exceptions)

In the embodiment, the channel quality is RSRP, CQ_TH_CE0 is −110 dBm and CQ_TH_CE1 is −120 dBm.

TABLE 7

RSRP Measurement Value Range

| Reported value | Measured quantity value | Unit |
| --- | --- | --- |
| NRSRP_00 | NRSRP < −156 | dBm |
| NRSRP_01 | −156 ≤ NRSRP < −155 | dBm |
| NRSRP_02 | −155 ≤ NRSRP < −154 | dBm |
| ... | ... | ... |
| NRSRP_111 | −46 ≤ NRSRP < −45 | dBm |
| NRSRP_112 | −45 ≤ NRSRP < −44 | dBm |
| NRSRP_113 | −44 ≤ NRSRP | dBm |

In the embodiment, the base station increases the channel quality threshold values corresponding to CE level 0 and CE level 1. As shown in FIG. 6, the channel quality threshold value of CE level 0 is increased from the originally configured CQ_TH_CE0 to New_CQ_TH_CE0=−105 dBm, and the channel quality threshold value of CE level 1 is increased from the originally configured CQ_TH_CE1 to New_CQ_TH_CE1=−115 dBm. The base station sends the new threshold values New_CQ_TH_CE0 and New_CQ_TH_CE1 to the UE.

Because the channel quality threshold value corresponding to the CE level is increased, the success rate of uplink channel transmission can be improved. However, the CE levels selected by some UEs are large, so that the numbers of repeated sending times of downlink channels corresponding to the UEs are large, and the waste of resources is caused. For example, after the channel quality threshold value is increased, the CE level corresponding to the UE whose channel quality is in the Range 2 area is increased from CE level 0 to CE level 1, so that the base station performs selection according to CE level 1 when configuring the numbers of repeated sending times of the downlink channels for such UEs. Thus, the waste of resources is caused due to the large numbers of repeated sending times of the downlink channels corresponding to the UEs. Such a problem of the waste of resources also exists for UEs in the Range 4 area. In order to overcome this problem, the UE transmits adjustment information of a downlink channel through an Msg3 message.

The adjustment information of a downlink channel includes at least one of:
  adjusted repeated sending information of a downlink channel, where the repeated sending information includes a repeated sending level or the number of repeated sending times;
  adjusted modulation coding information of a downlink channel;
  an adjustment amount of repeated sending information of a downlink channel;
  an adjustment amount of modulation coding information of a downlink channel; or channel quality measurement information of a downlink channel, where the channel quality measurement information includes a channel quality measurement value or a channel quality value range where a channel quality measurement value is located.

In the embodiment, UE1 determines that UE1 itself belongs to CE level 0 through RSRP measurement and comparison with new threshold values New_CQ_TH_CE0 and New_CQ_TH_CE1, and selects a random access resource from the random access resources corresponding to CE level 0 to send a random access signal.

In the embodiment, since UE1 experiences excessive uplink interference or the random access resource selected by UE1 collides with random access resources of other UEs, or for other reasons, the random access signal sent by UE1 on the random access resource corresponding to CE level 0 cannot be successfully received by the base station, and then UE1 jumps to CE level 1, and selects a random access resource from the random access resources corresponding to CE level 1 to send the random access signal. However, the RSRP measurement value of UE1 is still in Range 1.

In the embodiment, after selecting the random access resource from the random access resources corresponding to CE level 1 to send the random access signal, the UE1 successfully receives an RAR message sent by the base station. At this time, the base station considers that the RSRP measurement value of the UE is in the Range 2 area and the Range 3 area. UE1 sends the Msg3 message through a resource allocated for UE1 in the RAR, and transmits adjustment information of the downlink channel in Msg3.

When the adjustment information of the downlink channel includes the downlink channel quality (RSRP), since the base station considers that the RSRP measurement value of UE1 is in the Range 2 area and the Range 3 area, while the RSRP measurement value of UE1 is in the Range 1 area, the method for sending the downlink channel quality is as follows.

(1) The Range 2 area and the Range 3 area are quantized by N (where N is greater than or equal to 1) bits. For example, the Range 2 area and the Range 3 area are divided into $2^N$ small ranges. Taking N=3 as an example, the Range 2 area and the Range 3 area are uniformly divided into 8 small ranges, where "000" represents a first small range, "001" represents a second small range, and so on, and "111" represents an eighth small range.

(2) UE1 selects an index corresponding to one small range closest to Range 1, and sends the index to the base station through the Msg3 message.

After receiving the Msg3 message sent by UE1, the base station considers that the RSRP measurement value of UE1 is in the Range 2 area and the Range 3 area, and the specific value is determined by the N bits.

Application Embodiment Ten (Handling Some Exceptions)

In the embodiment, the channel quality is RSRP.

In the embodiment, the base station increases the channel quality threshold values corresponding to CE level 0 and CE level 1. As shown in FIG. 6, the channel quality threshold value of CE level 0 is increased from the originally configured CQ_TH_CE0 to New_CQ_TH_CE0, and the channel quality threshold value of CE level 1 is increased from the originally configured CQ_TH_CE1 to New_CQ_TH_CE1. The base station sends the new threshold values New_CQ_TH_CE0 and New_CQ_TH_CE1 to the UE.

Because the channel quality threshold value corresponding to the CE level is increased, the success rate of uplink channel transmission can be improved. However, the CE levels selected by some UEs are large, so that the numbers of repeated sending times of downlink channels corresponding to the UEs are large, and the waste of resources is caused. For example, after the channel quality threshold value is increased, the CE level corresponding to the UE whose channel quality is in the Range 2 area is increased from CE level 0 to CE level 1, so that the base station performs selection according to CE level 1 when configuring the numbers of repeated sending times of the downlink channels for such UEs. Thus, the waste of resources is caused due to the large numbers of repeated sending times of the downlink channels corresponding to the UEs. Such a problem of the waste of resources also exists for UEs in the Range 4 area. In order to overcome this problem, the UE transmits adjustment information of a downlink channel through the Msg3 message.

In the embodiment, UE1 determines that UE1 itself belongs to CE level 0 through RSRP measurement and comparison with new threshold values New_CQ_TH_CE0 and New_CQ_TH_CE1, and selects a random access resource from the random access resources corresponding to CE level 0 to send a random access signal.

In the embodiment, since UE1 experiences excessive uplink interference or the random access resource selected by UE1 collides with random access resources of other UEs, or for other reasons, the random access signal sent by UE1 on the random access resource corresponding to CE level 0 cannot be successfully received by the base station, and then UE1 jumps to CE level 1, and selects a random access resource from the random access resources corresponding to CE level 1 to send the random access signal. However, the RSRP measurement value of UE1 is still in Range 1.

In the embodiment, after selecting the random access resource from the random access resources corresponding to CE level 1 to send the random access signal, the UE1 successfully receives an RAR message sent by the base station. At this time, the base station considers that the RSRP measurement value of the UE is in the Range 2 area and the Range 3 area. UE1 sends the Msg3 message through a resource allocated for UE1 in the RAR, and transmits adjustment information of the downlink channel in Msg3.

When the adjustment information of the downlink channel includes the downlink channel quality (RSRP), since the base station considers that the RSRP measurement value of UE1 is in the Range 2 area and the Range 3 area, while the RSRP measurement value of UE1 is in the Range 1 area, the method for sending the downlink channel quality is as follows.

(1) The downlink channel quality is indicated by N bits, where the N bits may represent $2^N$ states. N1 states among the $2^N$ states are selected for quantizing the Range 2 area and the Range 3 area. N2 states are used for quantizing all RSRP areas except the Range 2 area and the Range 3 area, where $2^N=N1+N2$. Taking N=4, N1=10, and N2=6 as an example, the Range 2 area and the Range 3 area are divided into 10 small ranges, where "0000" represents a first small range, "0001" represents a second small range, and so on, and "1001" represents a tenth small range. The six states of "1010" to "1111" are used for quantizing the Range 1 area, the Range 4 area and the Range 5 area.

(2) UE1 finds a range where the measured RSRP value is located from RSRP ranges corresponding to the six states of "0111" to "1111" according to the measured RSRP value, and sends the state value corresponding to the range to the base station through the Msg3 message.

Application Embodiment Eleven (Handling Some Exceptions)

In the embodiment, the channel quality is RSRP.

In the embodiment, the base station increases the channel quality threshold values corresponding to CE level 0 and CE level 1. As shown in FIG. 6, the channel quality threshold value of CE level 0 is increased from the originally configured CQ_TH_CE0 to New_CQ_TH_CE0, and the channel quality threshold value of CE level 1 is increased from the originally configured CQ_TH_CE1 to New_CQ_TH_CE1. The base station sends the new threshold values New_CQ_TH_CE0 and New_CQ_TH_CE1 to the UE.

Because the channel quality threshold value corresponding to the CE level is increased, the success rate of uplink channel transmission can be improved. However, the CE levels selected by some UEs are large, so that the numbers of repeated sending times of downlink channels corresponding to the UEs are large, and the waste of resources is caused. For example, after the channel quality threshold value is increased, the CE level corresponding to the UE whose channel quality is in the Range 2 area is increased from CE level 0 to CE level 1, so that the base station performs selection according to CE level 1 when configuring the numbers of repeated sending times of the downlink channels for such UEs. Thus, the waste of resources is caused due to the large numbers of repeated sending times of the downlink channels corresponding to the UEs. Such a problem of the waste of resources also exists for UEs in the Range 4 area. In order to overcome this problem, the UE transmits adjustment information of a downlink channel through the Msg3 message.

In the embodiment, UE1 determines that UE1 itself belongs to CE level 0 through RSRP measurement and comparison with new threshold values New_CQ_TH_CE0 and New_CQ_TH_CE1, and selects a random access resource from the random access resources corresponding to CE level 0 to send a random access signal.

In the embodiment, since UE1 experiences excessive uplink interference or the random access resource selected by UE1 collides with random access resources of other UEs, or for other reasons, the random access signal sent by UE1 on the random access resource corresponding to CE level 0 cannot be successfully received by the base station, and then UE1 jumps to CE level 1, and selects a random access resource from the random access resources corresponding to CE level 1 to send the random access signal. However, the RSRP measurement value of UE1 is still in Range 1.

In the embodiment, after selecting the random access resource from the random access resources corresponding to CE level 1 to send the random access signal, the UE1 successfully receives an RAR message sent by the base station. At this time, the base station considers that the RSRP measurement value of the UE is in the Range 2 area and the Range 3 area. UE1 sends the Msg3 message through a resource allocated for UE1 in the RAR, and transmits adjustment information of the downlink channel in Msg3.

When the adjustment information of the downlink channel includes the downlink channel quality (RSRP), since the base station considers that the RSRP measurement value of UE1 is in the Range 2 area and the Range 3 area, while the RSRP measurement value of UE1 is in the Range 1 area, the method for sending the downlink channel quality is as follows.

(1) The downlink channel quality is indicated by N bits, where the N bits may represent $2^N$ states. N1 states among the $2^N$ states are selected for quantizing the Range 2 area and the Range 3 area. N2 states are used for quantizing the Range 1 area, where $2^N=N1+N2$. Taking N=4, N1=12, and N2=4 as an example, the Range 2 area and the Range 3 area are divided into 12 small ranges, where "0000" represents a first small range, "0001" represents a second small range, and so on, and "1011" represents a twelfth small range. The four states of "1100" to "1111" are used for quantizing the Range 1 area.

(2) UE1 finds a range where the measured RSRP value is located from RSRP ranges corresponding to the six states of "0111" to "1111" according to the measured RSRP value, and sends the state value corresponding to the range to the base station through the Msg3 message.

Application Embodiment Twelve (Method for Sending a Random Access Signal: a First Structure Including Three Symbol Groups)

The terminal sends the random access signal to the base station. The random access signal includes one first structure, and repeated sending of the random access signal is supported.

The first structure includes three symbol groups, where a subcarrier index occupied by a first symbol group and a subcarrier index occupied by a second symbol group differ by one subcarrier, and a subcarrier index occupied by the second symbol group and a subcarrier index occupied by a third symbol group differ by six subcarriers.

FIG. 7 illustrates twelve constituent patterns of a first structure when the frequency domain is configured with 12 subcarriers, where the same resource index represents the subcarrier index selected by three symbol groups in the same first structure.

Figure 8:
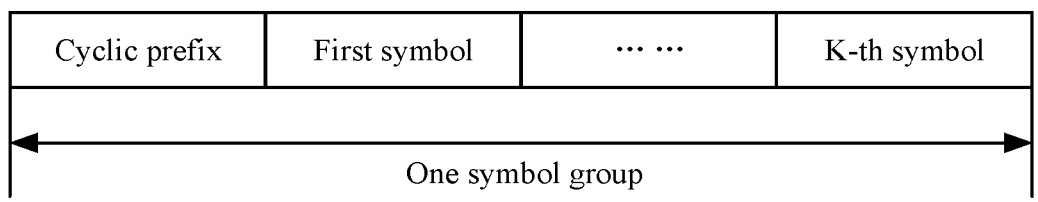
FIG. 8 is a structural diagram of a first symbol group according to an embodiment of the present application.

In the embodiment, the symbol group of the first structure includes a cyclic prefix and K (where K is greater than 1) symbols, as shown in FIG. 8.

Figure 9:
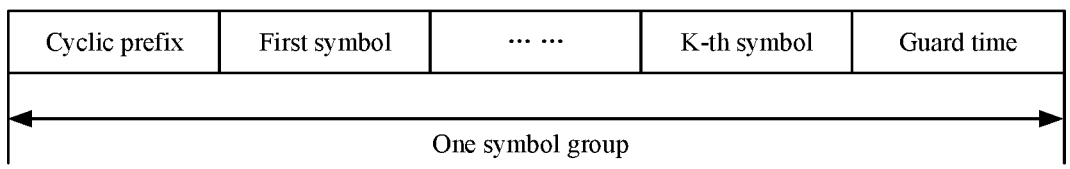
FIG. 9 is a structural diagram of a second symbol group according to an embodiment of the present application.

Alternatively, the symbol group of the first structure includes a cyclic prefix, K (where K is greater than 1) symbols and guard time, as shown in FIG. 9.

Each symbol in the same symbol group of the first structure occupies the same subcarrier in the frequency domain.

In the embodiment, repeated sending of the random access signal is supported, i.e., when the random access signal includes multiple first structures, the index of the first one of the first structures is defined as 1, the index of the second one of the first structures is defined as 2, and so on.

In the embodiment, a subcarrier index occupied by a first symbol group in a first structure having an odd index is randomly selected from a first subcarrier set; and a subcarrier index occupied by a first symbol group in a first structure having an even index is randomly selected from a second subcarrier set.

The number of subcarriers included in the first subcarrier set is 12, and the indexes are 0 to 11.

The second subcarrier set is determined according to the rules described below.

When a subcarrier index occupied by a first symbol group in a first structure having an odd index before the first structure having the even index is one of indexes {0, 2, 4} in the first subcarrier set, the second subcarrier set includes subcarriers having indexes {7, 9, 11} in the first subcarrier set.

When a subcarrier index occupied by a first symbol group in a first structure having an odd index before the first structure having the even index is one of indexes {6, 8, 10} in the first subcarrier set, the second subcarrier set includes subcarriers having indexes {1, 3, 5} in the first subcarrier set.

When a subcarrier index occupied by a first symbol group in a first structure having an odd index before the first structure having the even index is one of indexes {1, 3, 5} in the first subcarrier set, the second subcarrier set includes subcarriers having indexes {6, 8, 10} in the first subcarrier set.

When a subcarrier index occupied by a first symbol group in a first structure having an odd index before the first structure having the even index is one of indexes {7, 9, 11} in the first subcarrier set, the second subcarrier set includes subcarriers having indexes {0, 2, 4} in the first subcarrier set.

Application Embodiment Thirteen (Method for Sending a Random Access Signal: The First Structure Including Four Symbols)

The terminal sends a random access signal to the base station. The random access signal includes one first structure, and repeated sending of the random access signal is supported.

The first structure includes four symbol groups, where a subcarrier index occupied by a first symbol group and a subcarrier index occupied by a second symbol group differ by one subcarrier, and a subcarrier index occupied by a third symbol group and a subcarrier index occupied by a fourth symbol group differ by six subcarriers. The first symbol group and the second symbol group are consecutive in the time domain, the third symbol group and the fourth symbol group are consecutive in the time domain, and the second symbol group and the third symbol group are discrete in the time domain.

Figure 10:
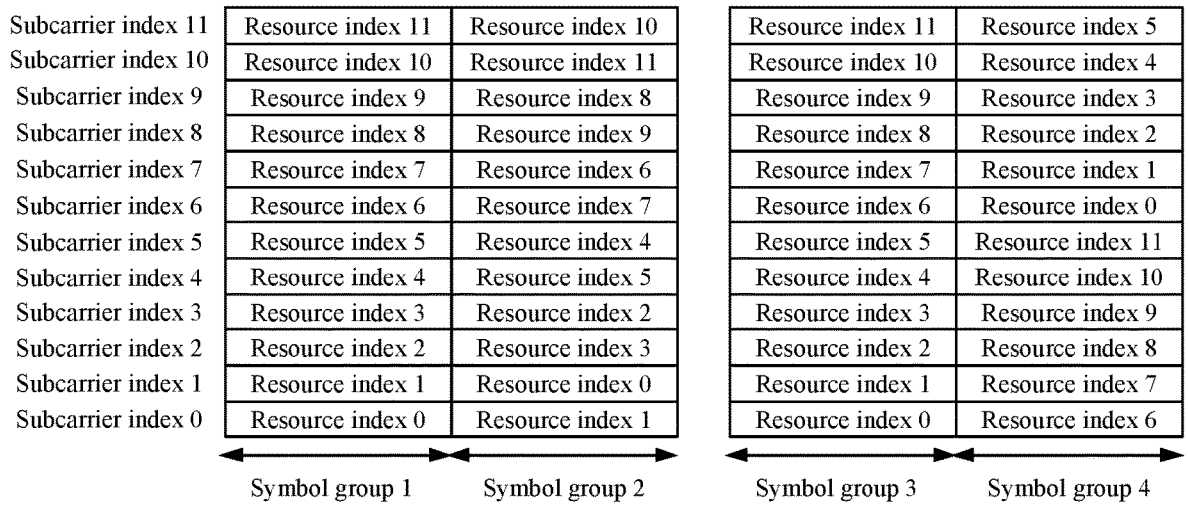
FIG. 10 is a schematic diagram illustrating twelve constituent patterns of a second type of a first structure according to an embodiment of the present application.

FIG. 10 illustrates twelve constituent patterns of a first structure when twelve subcarriers are configured in the frequency domain. For symbol group 1 and symbol group 2, the same index represents the subcarrier index selected by two symbol groups in the same first structure. For symbol group 3 and symbol group 4, the same index represents the subcarrier index selected by two symbol groups in the same first structure. The subcarrier index corresponding to {symbol group 1 and symbol group 2} and the subcarrier index corresponding to {symbol group 3 and symbol group 4} are independently selected.

In the embodiment, the symbol group of the first structure includes a cyclic prefix and K (where K is greater than 1) symbols, as shown in FIG. 8.

Alternatively, the symbol group of the first structure includes a cyclic prefix, K (where K is greater than 1) symbols and guard time, as shown in FIG. 9.

Each symbol in the same symbol group of the first structure occupies the same subcarrier in the frequency domain.

In the embodiment, repeated sending of the random access signal is supported, i.e., when the random access signal includes multiple first structures, the index of the first of the first structures is defined as 1, the index of the second of the first structures is defined as 2, and so on.

In the embodiment, a subcarrier index occupied by a first symbol group in a first structure having an odd index is randomly selected from a third subcarrier set; a subcarrier index occupied by a third symbol group in a first structure having an odd index is randomly selected from a fourth subcarrier set; a subcarrier index occupied by a first symbol group in a first structure having an even index is selected from a fifth subcarrier set; and a subcarrier index occupied by a third symbol group in the first structure having the even index is selected from a sixth subcarrier set.

The number of subcarriers included in the third subcarrier set is 12, and the indexes are 0 to 11.

The number of subcarriers included in the fourth subcarrier set is 12, and the indexes are 0 to 11.

The fifth subcarrier set is determined according to one of the rules described below.

When a subcarrier index occupied by a first symbol group in a first structure having an odd index before the first structure having the even index is a subcarrier having an even index in the third subcarrier set, the fifth subcarrier set includes subcarriers having odd indexes in the third subcarrier set.

When a subcarrier index occupied by a first symbol group in a first structure having an odd index before the first structure having the even index is a subcarrier having an odd index in the third subcarrier set, the fifth subcarrier set includes subcarriers having even indexes in the third subcarrier set.

The sixth subcarrier set is determined according to a rule described below.

When a subcarrier index occupied by a third symbol group in a first structure having an odd index before the first structure having the even index is a subcarrier having an index of {0, 1, 2, 3, 4, 5} in the fourth subcarrier set, the sixth subcarrier set includes subcarriers having indexes {6, 7, 8, 9, 10, 11} in the fourth subcarrier set.

Application Embodiment Fourteen (Method for Sending a Random Access Signal: Msg2 Message)

Three CE Levels are supported in the wireless communication system, each coverage enhancement level corresponds to a value range of RSRP, and a channel corresponding to each coverage enhancement level is configured with a number of repeated sending times.

In the wireless communication system, a UE sends a random access signal (also referred to as Msg1) to a base station through a random access channel, and after the base station receives the Msg1, the base station sends an RAR message (also referred to as Msg2) through a downlink channel. The RAR is formed by at least a MAC header and MAC payload. The MAC header is the header of the MAC layer, and the MAC payload is the load of the MAC layer.

When the MAC subheader includes BI information, the adjustment information of Msg1 is sent in the MAC payload. As shown in FIG. 11, the resource marked "Adjustment information" in FIG. 11 is the resource position occupied by the adjustment information of Msg1.

Two MAC subheader (subheader of the MAC layer) structures are included in FIG. 11, and the two MAC subheader structures are "E/T/RAPID MAC subheader" as shown in FIG. 12 and having the length of 8 bits, and "E/T/R/R/BI MAC subheader" as shown in FIG. 13 and having the length of 8 bits, respectively.

The meaning of multiple variables is as follows.

"E" is used for indicating whether the MAC subheader is followed by other subheaders. That "E" is configured as "1" indicates that the MAC subheader is followed by other subheaders. That "E" is configured as "0" indicates that the subheader is directly followed by the MAC RAR or padding bits.

"T" is used for indicating whether the subheader includes an RAPID or a BI. That "T" is configured as "1" indicates that the subheader includes the RAPID. That "T" is configured as "0" indicates that the subheader includes the BI.

"R" is a reserved bit and configured as "0".

The BI occupies 4 bits; the RAPID occupies 6 bits.

In the embodiment, if n (where n is greater than 0) MAC RARs exist in the MAC payload, the adjustment information of Msg1 is sent after the MAC RAR having index n, as shown in FIG. 11.

In the embodiment, the adjustment information of Msg1 includes at least one of:
an adjusted coverage enhancement level;
adjusted repeated sending information of Msg1, where the repeated sending information includes a repeated sending level or the number of repeated sending times;
an adjusted initial target received power value of Msg1;
adjusted transmit beam information selected for sending Msg1, where the transmit beam information includes a transmit beam direction or a transmit beam index;
adjusted index information of an SS/PBCH block of resource configuration information of Msg1;
an adjustment amount of a coverage enhancement level;
an adjustment amount of repeated sending information of Msg1;
an adjustment amount of an initial target received power value of Msg1;
an adjustment amount of transmit beam information selected for sending Msg1; or an adjustment amount of index information of an SS/PBCH block of resource configuration information of Msg1.

In an embodiment, the adjustment information of Msg1 is for the same coverage enhancement level.

Application Embodiment Fifteen (Method for sending a random access signal: an Msg2 message including a MAC RAR)

Three CE Levels are supported in the wireless communication system, each coverage enhancement level corresponds to a value range of RSRP, and a channel corresponding to each coverage enhancement level is configured with a number of repeated sending times.

In the wireless communication system, a UE sends a random access signal (also referred to as Msg1) to a base station through a random access channel, and after the base station receives the Msg1, the base station sends an RAR message (also referred to as Msg2) through a downlink channel. The RAR is formed by at least a MAC header and MAC payload. The MAC header is the header of the MAC layer, and the MAC payload is the load of the MAC layer.

When the MAC subheader includes BI information, the adjustment information of Msg1 is sent in the MAC payload. As shown in FIG. 11, the resource marked "Adjustment information" in FIG. 11 is the resource position occupied by the adjustment information of Msg1.

Two MAC subheader (subheader of the MAC layer) structures are included in FIG. 11, and the two MAC subheader structures are "E/T/RAPID MAC subheader" as shown in FIG. 12 and having the length of 8 bits, and "E/T/R/R/BI MAC subheader" as shown in FIG. 13 and having the length of 8 bits, respectively.

In the embodiment, if n (where n is greater than 0) MAC RARs exist in the MAC payload, the adjustment information of Msg1 is sent after the MAC RAR having index n, as shown in FIG. 11.

In the embodiment, the adjustment information of Msg1 includes at least one of: adjusted index information of an SS/PBCH block of resource configuration information of Msg1, or an adjustment amount of index information of an SS/PBCH block of resource configuration information of Msg1.

In the embodiment, the SS/PBCH block is a time domain-frequency domain resource block including at least an SS and a PBCH. An SIB is sent in a physical broadcast channel. K (where K is greater than or equal to 1) SS/PBCH blocks may be configured in the system.

In an embodiment, among the K SS/PBCH blocks, Msg1 resource configuration information exists in each SS/PBCH block; or Msg1 resource configuration information exists in part of SS/PBCH blocks among the K SS/PBCH blocks. The Msg1 resource configuration information in the SS/PBCH block (s) including the Msg1 resource configuration information may be independently configured.

In the embodiment, the Msg1 resource configuration information includes at least one of the following: a time-frequency resource occupied by Msg1, a preamble sequence occupied by Msg1, or a transmit beam used for sending Msg1.

In the embodiment, the adjustment information of Msg1 is for the same coverage enhancement level.

Application Embodiment Sixteen (Method for sending a random access signal: an Msg2 message not including a MAC RAR)

Three CE Levels are supported in the wireless communication system, each coverage enhancement level corresponds to a value range of RSRP, and a channel corresponding to each coverage enhancement level is configured with a number of repeated sending times.

In the wireless communication system, a UE sends a random access signal (also referred to as Msg1) to a base station through a random access channel, and after the base station receives the Msg1, the base station sends an RAR message (also referred to as Msg2) through a downlink channel. The RAR is formed by at least a MAC header and MAC payload. The MAC header is the header of the MAC layer, and the MAC payload is the load of the MAC layer.

When the MAC subheader includes BI information, the adjustment information of Msg1 is sent in the MAC payload. As shown in FIG. 11, the resource marked "Adjustment information" in FIG. 11 is the resource position occupied by the adjustment information of Msg1.

Figure 14:
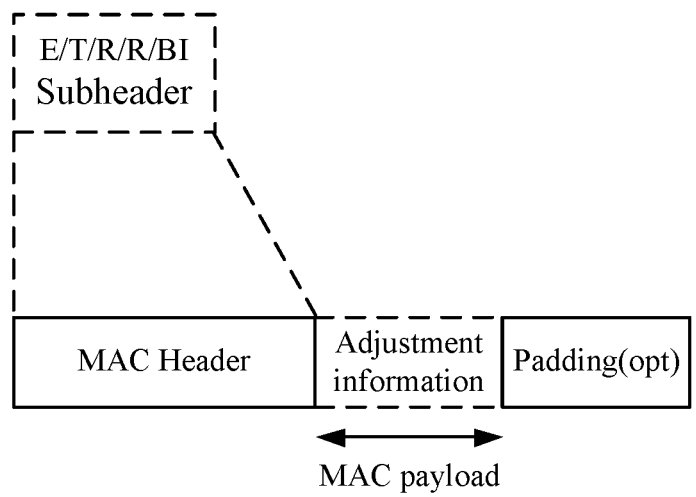
FIG. 14 is a schematic diagram illustrating a second resource position occupied by adjustment information of Msg1 according to an embodiment of the present application.

One MAC subheader (subheader of the MAC layer) structure included in FIG. 14 is "E/T/R/R/BI MAC subheader" as shown in FIG. 13 and having the length of 8 bits.

The meaning of multiple variables is as follows.

"E" is used for indicating whether the MAC subheader is followed by other subheaders. That "E" is configured as "1" indicates that the MAC subheader is followed by other subheaders. That "E" is configured as "0" indicates that the subheader is directly followed by the MAC RAR or padding bits.

"T" is used for indicating whether the subheader includes an RAPID or a BI. That "T" is configured as "1" indicates that the subheader includes the RAPID. That "T" is configured as "0" indicates that the subheader includes the BI.

"R" is a reserved bit and configured as "0".

The BI occupies 4 bits; the RAPID occupies 6 bits.

In the embodiment, if the MAC RAR does not exist in the MAC payload, the adjustment information of Msg1 is sent after the MAC header, as shown in FIG. 14.

In the embodiment, the adjustment information of Msg1 includes at least one of:
  an adjusted coverage enhancement level;
  adjusted repeated sending information of Msg1;
  an adjusted initial target received power value of Msg1;
  adjusted transmit beam information selected for sending Msg1, where the transmit beam information includes a transmit beam direction or a transmit beam index;
  adjusted index information of an SS/PBCH block of resource configuration information of Msg1;
  an adjustment amount of a coverage enhancement level;
  an adjustment amount of repeated sending information of Msg1;
  an adjustment amount of an initial target received power value of Msg1;
  an adjustment amount of transmit beam information selected for sending Msg1; or
  an adjustment amount of index information of an SS/PBCH block of resource configuration information of Msg1.

In the embodiment, the adjustment information of Msg1 is for the same coverage enhancement level.

Application Embodiment Seventeen (Method for Sending a Random Access Signal: Sending Adjustment Information of Msg1 Through a Subheader of an Msg2 Message)

Three CE Levels are supported in the wireless communication system, each coverage enhancement level corresponds to a value range of RSRP, and a channel corresponding to each coverage enhancement level is configured with a number of repeated sending times.

In the wireless communication system, a UE sends a random access signal (also referred to as Msg1) to a base station through a random access channel, and after the base station receives the Msg1, the base station sends an RAR message (also referred to as Msg2) through a downlink channel. The RAR is formed by at least a MAC header and MAC payload. The MAC header is the header of the MAC layer, and the MAC payload is the load of the MAC layer.

Figure 15:
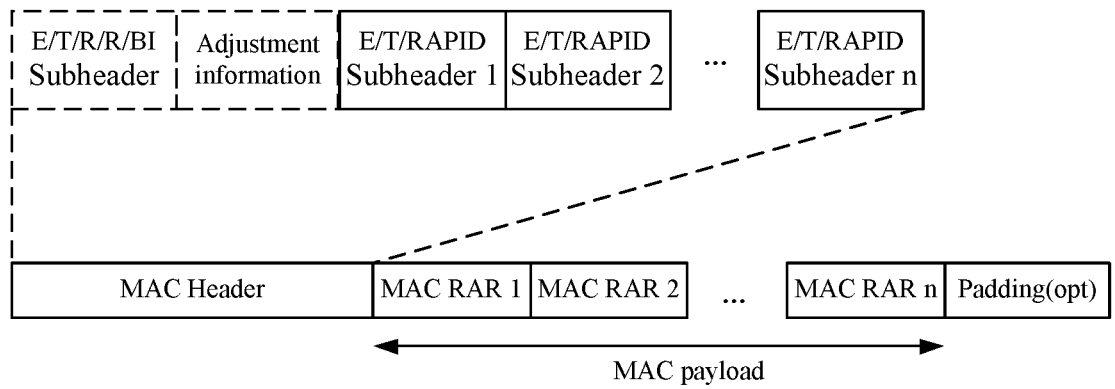
FIG. 15 is a schematic diagram illustrating a third resource position occupied by adjustment information of Msg1 according to an embodiment of the present application.

The adjustment information of Msg1 is sent through a MAC subheader in the MAC header, as shown in FIG. 15, and the resource marked "Adjustment information" in FIG. 15 is the MAC subheader position occupied by the adjustment information of Msg1.

Two MAC subheader (subheader of the MAC layer) structures are included in FIG. 15, and the two MAC subheader structures are "E/T/RAPID MAC subheader" as shown in FIG. 12 and having the length of 8 bits, and "E/T/R/R/BI MAC subheader" as shown in FIG. 13 and having the length of 8 bits.

In the embodiment, the MAC subheader occupied by the adjustment information of Msg1 has the same structure as the "E/T/RAPID MAC subheader", as shown in FIG. 12, and has the length of 8 bits.

Since the RAPID occupies 6 bits, a maximum of $2^6=64$ states may be described, the indexes are 0 to 63, and each state is referred to as a state bit. The PRACH subcarrier indexes are indicated by 0 to 47 in this example, and then a total of 16 state bits 48 to 63 are idle.

The "adjustment information of Msg1" is indicated by 16 RAPID idle state bits. For example, each idle state bit corresponds to a type of adjustment information of Msg1, and the UE learns the adjustment information of Msg1 after successfully receiving the above state bits.

The MAC subheader indicating the adjustment information of Msg1 is sent after the MAC subheader including BI information.

In the embodiment, the MAC subheader indicating the adjustment information of Msg1 is sent after the MAC subheader including BI information, as shown in FIG. 15.

In the embodiment, the adjustment information of Msg1 includes at least one of:
  an adjusted coverage enhancement level;
  adjusted repeated sending information of Msg1;
  an adjusted initial target received power value of Msg1;
  adjusted transmit beam information selected for sending the Msg1, where the transmit beam information includes a transmit beam direction or a transmit beam index;
  adjusted index information of an SS/PBCH block of resource configuration information of Msg1;
  an adjustment amount of a coverage enhancement level;
  an adjustment amount of repeated sending information of Msg1;
  an adjustment amount of an initial target received power value of Msg1;
  an adjustment amount of transmit beam information selected for sending Msg1; or an adjustment amount of index information of an SS/PBCH block of resource configuration information of Msg1.

In the embodiment, the adjustment information of Msg1 is for the same coverage enhancement level.

Application Embodiment Eighteen (Method for sending a random access signal: sending an identity indicating whether adjustment information of Msg1 is included through a subheader of an Msg2 message)

Three CE Levels are supported in the wireless communication system, each coverage enhancement level corresponds to a value range of RSRP, and a channel corresponding to each coverage enhancement level is configured with a number of repeated sending times.

In the wireless communication system, a UE sends a random access signal (also referred to as Msg1) to a base station through a random access channel, and after the base station receives the Msg1, the base station sends an RAR message (also referred to as Msg2) through a downlink channel. The RAR is formed by at least a MAC header and MAC payload. The MAC header is the header of the MAC layer, and the MAC payload is the load of the MAC layer.

Figure 16:
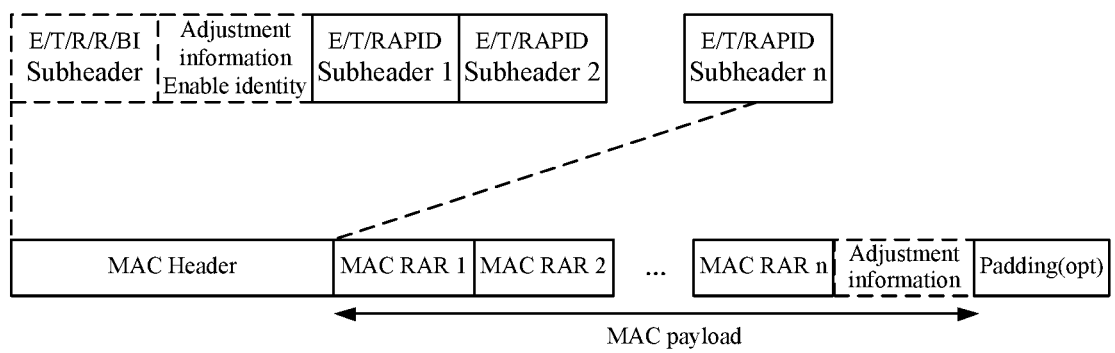
FIG. 16 is a schematic diagram illustrating a fourth resource position occupied by adjustment information of Msg1 according to an embodiment of the present application.

The adjustment information of Msg1 is sent in the RAR, where the structure of the RAR is as shown in FIG. 16. Two MAC subheader (subheader of the MAC layer) structures are included in FIG. 16, and the two MAC subheader structures are "E/T/RAPID MAC subheader" as shown in FIG. 12 and having the length of 8 bits, and "E/T/R/R/BI MAC subheader" as shown in FIG. 13 and having the length of 8 bits, respectively.

In the embodiment, the adjustment information of Msg1 is sent in the MAC payload, and as shown in FIG. 16, the resource marked "Adjustment information" in FIG. 16 is the resource position occupied by the adjustment information of Msg1.

In the embodiment, if n (where n is greater than 0) MAC RARs exist in the MAC payload, the adjustment information of Msg1 is sent after the MAC RAR having index n, as shown in FIG. 16.

In the embodiment, whether adjustment information of Msg1 is included in the MAC payload is indicated through a MAC subheader, where the MAC subheader has the same structure as the "E/T/RAPID MAC subheader", as shown in FIG. 12, has the length of 8 bits, and is sent after the MAC subheader including BI information. The specific method for indicating whether the adjustment information of Msg1 is included in the MAC payload includes the steps described below.

Firstly, whether the adjustment information of Msg1 is included in the MAC payload is indicated through a state bit of the RAPID in the MAC subheader.

Then, when the state bit of the RAPID indicates that the adjustment information of Msg1 is included in the MAC payload, and n (where n is greater than 0) MAC RARs exist in the MAC payload, the adjustment information of Msg1 is sent after the last MAC RAR in the MAC payload. When the state bit of the RAPID indicates that the adjustment information of Msg1 is included in the MAC payload, and the MAC RAR does not exist in the MAC payload, the adjustment information of Msg1 is sent after the MAC header.

In the embodiment, the adjustment information of Msg1 includes at least one of:
an adjusted coverage enhancement level;
adjusted repeated sending information of Msg1;
an adjusted initial target received power value of Msg1;
adjusted transmit beam information selected for sending Msg1, where the transmit beam information includes a transmit beam direction or a transmit beam index;
adjusted index information of an SS/PBCH block of resource configuration information of Msg1;
an adjustment amount of a coverage enhancement level;
an adjustment amount of repeated sending information of Msg1;
an adjustment amount of an initial target received power value of Msg1;
an adjustment amount of transmit beam information selected for sending Msg1; or
an adjustment amount of index information of an SS/PBCH block of resource configuration information of Msg1.

In the embodiment, the adjustment information of Msg1 is for the same coverage enhancement level.

It should be noted that the UE in the multiple application embodiments described above may be understood as the terminal.

In the present application, the features of the multiple embodiments, if not in collision, may be combined with each other into one embodiment for use. Each embodiment is merely an optimal implementation mode of the present application, and is not intended to limit the scope of the present application.

It will be understood by those skilled in the art that all or part of the steps in the methods described above may be implemented by related hardware instructed by programs, and these programs may be stored in a computer-readable storage medium such as a read-only memory, a magnetic disk or an optical disk. In an embodiment, all or part of the steps in the embodiments described above may also be implemented by using one or more integrated circuits. Accordingly, the modules/units in the embodiments described above may be implemented by hardware or a software functional module. The present application is not limited to any specific combination of hardware and software.

What is claimed is:

1. A method, comprising:
receiving, by a terminal, a first message that comprises a set of channel quality threshold values, wherein the set of channel quality threshold values comprises at least one channel quality threshold value; and
sending, by the terminal, a random access preamble (Msg1) message,
wherein the Msg1 message comprises a plurality of first structures and each of the plurality of first structures comprises four symbol groups,
a subcarrier index occupied by a first symbol group of the four symbol groups, in a first structure of the plurality of first structures having an odd index, is selected from a third subcarrier set, wherein a number of subcarriers comprised in the third subcarrier set is 12, and
a subcarrier index occupied by the first symbol group of the four symbol groups, in a first structure of the plurality of first structures having an even index, is selected from a fifth subcarrier set, wherein the fifth subcarrier set is determined according to one of following rules:
in a condition that a subcarrier index occupied by the first symbol group in the first structure having an odd index before the first structure having the even index corresponds to a subcarrier having an even index in the third subcarrier set, the fifth subcarrier set comprises subcarriers having odd indexes in the third subcarrier set; or
in a condition that a subcarrier index occupied by the first symbol group in the first structure having an odd index before the first structure having the even index corresponds to a subcarrier having an odd index in the third subcarrier set, the fifth subcarrier set comprises subcarriers having even indexes in the third subcarrier set.

2. The method of claim 1, wherein the four symbol groups comprises:
the first symbol group, a second symbol group, a third symbol group and a fourth symbol group, wherein a subcarrier index occupied by the first symbol group and a subcarrier index occupied by the second symbol group differ by one subcarrier, and a subcarrier index occupied by the third symbol group and a subcarrier index occupied by the fourth symbol group differ by six subcarriers.

3. A non-transitory computer-readable storage medium, which is configured to store program code, wherein at least one processor executes the program code to perform the method of claim 2.

4. The method of claim 1, wherein each of the four symbol groups comprises a cyclic prefix and at least one symbol.

5. The method of claim 1, wherein a subcarrier index occupied by a third symbol group of the four symbol groups, in the first structure of the plurality of first structures having the odd index, is selected from a fourth subcarrier set;
a subcarrier index occupied by a third symbol group of the four symbol groups, in the first structure of the plurality of first structures having the even index, is selected from a sixth subcarrier set;
wherein a number of subcarriers comprised in the fourth subcarrier set is 12;
wherein the sixth subcarrier set is determined according to one of following rules:
in a condition that a subcarrier index occupied by the third symbol group in the first structure having an odd index before the first structure having the even index corresponds to a subcarrier having an index of {0, 1, 2, 3, 4, 5} in the fourth subcarrier set, the sixth subcarrier set comprises subcarriers having indexes {6, 7, 8, 9, 10, 11} in the fourth subcarrier set; or
in a condition that a subcarrier index occupied by the third symbol group in the first structure having an odd index before the first structure having the even index corresponds to a subcarrier having an index of {6, 7, 8, 9, 10, 11} in the fourth subcarrier set, the sixth subcarrier set comprises subcarriers having indexes {0, 1, 2, 3, 4, 5} in the fourth subcarrier set.

6. A non-transitory computer-readable storage medium, which is configured to store program code, wherein at least one processor executes the program code to perform the method of claim 1.

7. A terminal, comprising a processor, and a memory; wherein the processor is configured to execute programs stored in the memory to perform:
receiving a first message that comprises a set of channel quality threshold values, wherein the set of channel quality threshold values comprises at least one channel quality threshold value; and
sending a random access preamble (Msg1) message,
wherein the Msg1 message comprises a plurality of first structures and each of the plurality of first structures comprises four symbol groups,
a subcarrier index occupied by a first symbol group of the four symbol groups, in a first structure of the plurality of first structures having an odd index, is selected from a third subcarrier set, wherein a number of subcarriers comprised in the third subcarrier set is 12, and
a subcarrier index occupied by the first symbol group of the four symbol groups, in a first structure of the plurality of first structures having an even index, is selected from a fifth subcarrier set, wherein the fifth subcarrier set is determined according to one of following rules:
in a condition that a subcarrier index occupied by the first symbol group in the first structure having an odd index before the first structure having the even index corresponds to a subcarrier having an even index in the third subcarrier set, the fifth subcarrier set comprises subcarriers having odd indexes in the third subcarrier set; or
in a condition that a subcarrier index occupied by the first symbol group in the first structure having an odd index before the first structure having the even index corresponds to a subcarrier having an odd index in the third subcarrier set, the fifth subcarrier set comprises subcarriers having even indexes in the third subcarrier set.

8. The terminal of claim 7, wherein the four symbol groups comprises:
the first symbol group, a second symbol group, a third symbol group and a fourth symbol group, wherein a subcarrier index occupied by the first symbol group and a subcarrier index occupied by the second symbol group differ by one subcarrier, and a subcarrier index occupied by the third symbol group and a subcarrier index occupied by the fourth symbol group differ by six subcarriers.

9. The terminal of claim 7, wherein each of the four symbol groups comprises a cyclic prefix and at least one symbol.

10. The terminal of claim 7, wherein a subcarrier index occupied by a third symbol group of the four symbol groups, in the first structure of the plurality of first structures having the odd index, is selected from a fourth subcarrier set;
a subcarrier index occupied by a third symbol group of the four symbol groups, in the first structure of the plurality of first structures having the even index, is selected from a sixth subcarrier set;
wherein a number of subcarriers comprised in the fourth subcarrier set is 12;
wherein the sixth subcarrier set is determined according to one of following rules:
in a condition that a subcarrier index occupied by the third symbol group in the first structure having an odd index before the first structure having the even index corresponds to a subcarrier having an index of {0, 1, 2, 3, 4, 5} in the fourth subcarrier set, the sixth subcarrier set comprises subcarriers having indexes {6, 7, 8, 9, 10, 11} in the fourth subcarrier set; or
in a condition that a subcarrier index occupied by the third symbol group in the first structure having an odd index before the first structure having the even index corresponds to a subcarrier having an index of {6, 7, 8, 9, 10, 11} in the fourth subcarrier set, the sixth subcarrier set comprises subcarriers having indexes {0, 1, 2, 3, 4, 5} in the fourth subcarrier set.

11. A method, comprising:
sending, by a base station to a terminal, a first message that comprises a set of channel quality threshold values, wherein the set of channel quality threshold values comprises at least one channel quality threshold value; and
receiving, by the base station from the terminal, a random access preamble (Msg1) message,
wherein the Msg1 message comprises a plurality of first structures and each of the plurality of first structures comprises four symbol groups,
a subcarrier index occupied by a first symbol group of the four symbol groups, in a first structure of the plurality of first structures having an odd index, is selected from a third subcarrier set, wherein a number of subcarriers comprised in the third subcarrier set is 12, and
a subcarrier index occupied by the first symbol group of the four symbol groups, in a first structure of the plurality of first structures having an even index, is selected from a fifth subcarrier set, wherein the fifth subcarrier set is determined according to one of following rules:
in a condition that a subcarrier index occupied by the first symbol group in the first structure having an odd index before the first structure having the even index corresponds to a subcarrier having an even index in the third subcarrier set, the fifth subcarrier set comprises subcarriers having odd indexes in the third subcarrier set; or
in a condition that a subcarrier index occupied by the first symbol group in the first structure having an odd index before the first structure having the even index corresponds to a subcarrier having an odd index in the third subcarrier set, the fifth subcarrier set comprises subcarriers having even indexes in the third subcarrier set.

12. The method of claim 11, wherein the four symbol groups comprises:
   the first symbol group, a second symbol group, a third symbol group and a fourth symbol group, wherein a subcarrier index occupied by the first symbol group and a subcarrier index occupied by the second symbol group differ by one subcarrier, and a subcarrier index occupied by the third symbol group and a subcarrier index occupied by the fourth symbol group differ by six subcarriers.

13. A non-transitory computer-readable storage medium, which is configured to store program code, wherein at least one processor executes the program code to perform the method of claim 12.

14. The method of claim 11, wherein each of the four symbol groups comprises a cyclic prefix and at least one symbol.

15. The method of claim 11, wherein a subcarrier index occupied by a third symbol group of the four symbol groups, in the first structure of the plurality of first structures having the odd index, is selected from a fourth subcarrier set;
   a subcarrier index occupied by a third symbol group of the four symbol groups, in the first structure of the plurality of first structures having the even index, is selected from a sixth subcarrier set;
   wherein a number of subcarriers comprised in the fourth subcarrier set is 12;
   wherein the sixth subcarrier set is determined according to one of following rules:
   in a condition that a subcarrier index occupied by the third symbol group in the first structure having an odd index before the first structure having the even index corresponds to a subcarrier having an index of {0, 1, 2, 3, 4, 5} in the fourth subcarrier set, the sixth subcarrier set comprises subcarriers having indexes {6, 7, 8, 9, 10, 11} in the fourth subcarrier set; or
   in a condition that a subcarrier index occupied by the third symbol group in the first structure having an odd index before the first structure having the even index corresponds to a subcarrier having an index of {6, 7, 8, 9, 10, 11} in the fourth subcarrier set, the sixth subcarrier set comprises subcarriers having indexes {0, 1, 2, 3, 4, 5} in the fourth subcarrier set.

16. A non-transitory computer-readable storage medium, which is configured to store program code, wherein at least one processor executes the program code to perform the method of claim 11.

17. A base station, comprising a processor, and a memory, wherein the processor is configured to execute programs stored in the memory to perform:
   sending, to a terminal, a first message that comprises a set of channel quality threshold values, wherein the set of channel quality threshold values comprises at least one channel quality threshold value; and
   receiving, from the terminal, a random access preamble (Msg1) message,
   wherein the Msg1 message comprises a plurality of first structures and each of the plurality of first structures comprises four symbol groups,
   a subcarrier index occupied by a first symbol group of the four symbol groups, in a first structure of the plurality of first structures having an odd index, is selected from a third subcarrier set, wherein a number of subcarriers comprised in the third subcarrier set is 12, and
   a subcarrier index occupied by the first symbol group of the four symbol groups, in a first structure of the plurality of first structures having an even index, is selected from a fifth subcarrier set, wherein the fifth subcarrier set is determined according to one of following rules:
   in a condition that a subcarrier index occupied by the first symbol group in the first structure having an odd index before the first structure having the even index corresponds to a subcarrier having an even index in the third subcarrier set, the fifth subcarrier set comprises subcarriers having odd indexes in the third subcarrier set; or
   in a condition that a subcarrier index occupied by the first symbol group in the first structure having an odd index before the first structure having the even index corresponds to a subcarrier having an odd index in the third subcarrier set, the fifth subcarrier set comprises subcarriers having even indexes in the third subcarrier set.

18. The base station of claim 17, wherein the four symbol groups comprises:
   the first symbol group, a second symbol group, a third symbol group and a fourth symbol group, wherein a subcarrier index occupied by the first symbol group and a subcarrier index occupied by the second symbol group differ by one subcarrier, and a subcarrier index occupied by the third symbol group and a subcarrier index occupied by the fourth symbol group differ by six subcarriers.

19. The base station of claim 17, wherein each of the four symbol groups comprises a cyclic prefix and at least one symbol.

20. The base station of claim 17, wherein a subcarrier index occupied by a third symbol group of the four symbol groups, in the first structure of the plurality of first structures having the odd index, is selected from a fourth subcarrier set;
   a subcarrier index occupied by a third symbol group of the four symbol groups, in the first structure of the plurality of first structures having the even index, is selected from a sixth subcarrier set;
   wherein a number of subcarriers comprised in the fourth subcarrier set is 12;
   wherein the sixth subcarrier set is determined according to one of following rules:
   in a condition that a subcarrier index occupied by the third symbol group in the first structure having an odd index before the first structure having the even index corresponds to a subcarrier having an index of {0, 1, 2, 3, 4, 5} in the fourth subcarrier set, the sixth subcarrier set comprises subcarriers having indexes {6, 7, 8, 9, 10, 11} in the fourth subcarrier set; or
   in a condition that a subcarrier index occupied by the third symbol group in the first structure having an odd index before the first structure having the even index corresponds to a subcarrier having an index of {6, 7, 8, 9, 10, 11} in the fourth subcarrier set, the sixth subcarrier set comprises subcarriers having indexes {0, 1, 2, 3, 4, 5} in the fourth subcarrier set.

* * * * *